United States Patent
Deiss

(10) Patent No.: US 11,014,346 B2
(45) Date of Patent: May 25, 2021

(54) METHOD FOR PRODUCING A SEALING TAPE ROLL

(71) Applicant: ISO-Chemie GmbH, Aalen (DE)

(72) Inventor: Martin Deiss, Abtsgmuend (DE)

(73) Assignee: ISO-Chemie GmbH, Aalen (DE)

( * ) Notice: Subject to any disclaimer, the term of this patent is extended or adjusted under 35 U.S.C. 154(b) by 43 days.

(21) Appl. No.: 16/527,798

(22) Filed: Jul. 31, 2019

(65) Prior Publication Data

US 2020/0047474 A1 Feb. 13, 2020

(30) Foreign Application Priority Data

Aug. 7, 2018 (EP) .................................... 18187760

(51) Int. Cl.
| | |
|---|---|
| *B32B 37/00* | (2006.01) |
| *B32B 38/00* | (2006.01) |
| *B29C 69/00* | (2006.01) |
| *B29C 53/00* | (2006.01) |
| *B32B 37/02* | (2006.01) |

(Continued)

(52) U.S. Cl.
CPC .............. *B32B 37/02* (2013.01); *B32B 37/12* (2013.01); *B32B 37/16* (2013.01); *B32B 38/0004* (2013.01); *B32B 38/0012* (2013.01); *B29C 53/066* (2013.01); *B29C 69/00* (2013.01); *B32B 2305/022* (2013.01); *Y10T 156/1015* (2015.01); *Y10T 156/1026* (2015.01); *Y10T 156/1043* (2015.01); *Y10T 156/1046* (2015.01); *Y10T 156/1064* (2015.01); *Y10T 156/1082* (2015.01)

(58) Field of Classification Search
None
See application file for complete search history.

(56) References Cited

U.S. PATENT DOCUMENTS 1,573,629 A * 2/1926 Carver .................... B26D 1/03
156/211
3,235,432 A * 2/1966 George ................ B65D 65/403
156/201

(Continued)

FOREIGN PATENT DOCUMENTS

| EP | 2 428 632 A1 | 3/2012 | |
|---|---|---|---|
| EP | 2 990 551 A1 | 3/2016 | |
| WO | WO 9857607 | * 12/1998 | ............. A61F 13/00 |

OTHER PUBLICATIONS

EP 18 18 760.6 Search Report dated Jan. 17, 2019.

*Primary Examiner* — Linda L Gray
(74) *Attorney, Agent, or Firm* — Jansson Munger McKinley & Kirby Ltd.

(57) ABSTRACT

A method for producing a sealing tape with interior barrier layers, each of which extends between opposite end surfaces of the sealing tape, the method includes the steps of providing a first foam web; applying a first barrier layer to a first surface of the first foam web to form a laminated foam web; introducing a plurality of first cuts into the top surface and a plurality of second cuts into a bottom surface of the laminated foam web in the transverse direction, the cuts being offset from each other in the longitudinal direction, to form strips arranged behind each other in a row; folding over the strips to produce a foam-barrier layer web, such that subsections of the top surface lie opposite each other and subsections of the bottom surface lie opposite each other; and forming a sealing tape roll from the foam-barrier layer web.

15 Claims, 10 Drawing Sheets

(51) Int. Cl.
 *B32B 37/12* (2006.01)
 *B32B 37/16* (2006.01)
 *B29C 53/06* (2006.01)

(56) References Cited

U.S. PATENT DOCUMENTS

| | | | | |
|---|---|---|---|---|
| 3,706,173 | A * | 12/1972 | Taylor | B60J 10/33 |
| | | | | 52/717.03 |
| 3,943,022 | A * | 3/1976 | Susnjara | B29C 66/0242 |
| | | | | 156/211 |
| 4,377,159 | A * | 3/1983 | Hansen | A61F 13/0203 |
| | | | | 602/46 |
| 2003/0219565 | A1* | 11/2003 | Heartsfield | B29C 69/001 |
| | | | | 428/56 |
| 2014/0290835 | A1* | 10/2014 | Bradford | B29C 48/07 |
| | | | | 156/211 |

* cited by examiner

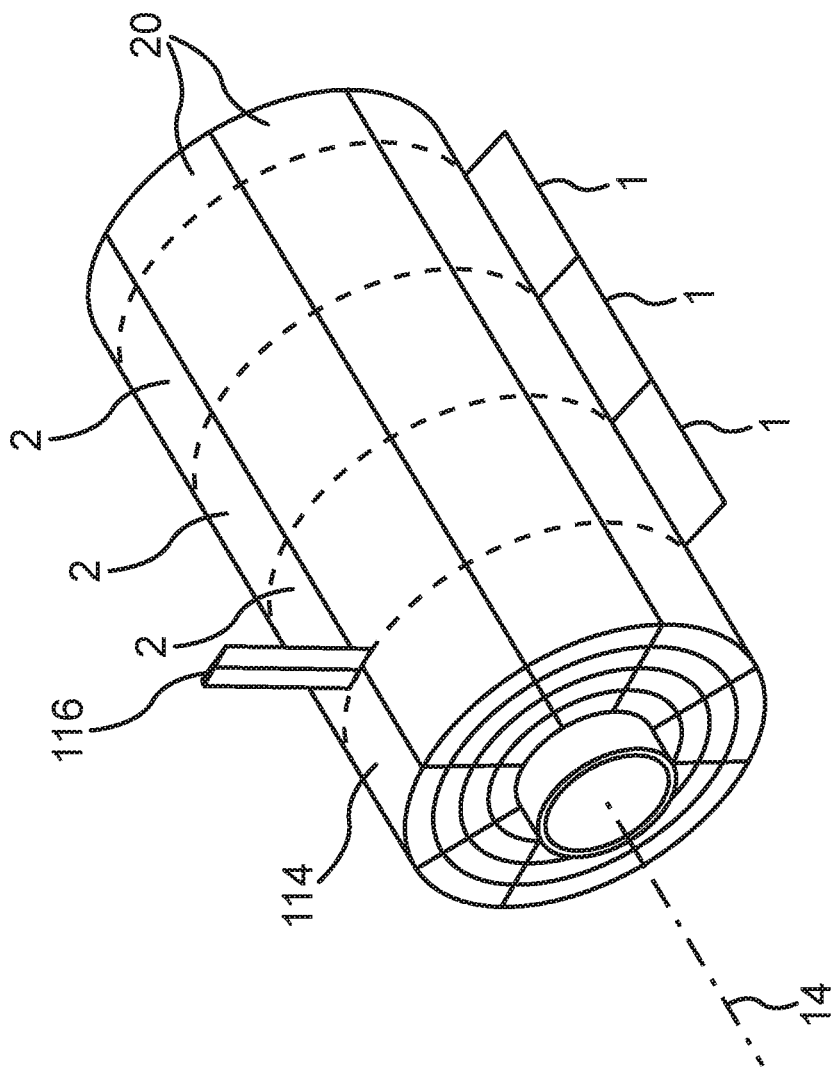

METHOD FOR PRODUCING A SEALING TAPE ROLL

FIELD OF THE INVENTION

The present invention relates to a method for producing a sealing tape roll with a plurality of internal barrier layers extending between end surfaces of the sealing tape roll lying opposite each other.

Sealing tapes unwound from sealing tape rolls are used to seal joints between a frame profile, such as that of a window or a door, and a building wall to seal off the joint against air drafts and driving rain. Such sealing tapes are usually wound up into sealing tape rolls under compression for space-saving storage, for transport, and for easier handling during installation. In addition to the permeability to air and the sealing property against driving rain, the resistance of the sealing tape to the diffusion of water vapor is considered one of the substantial properties of a sealing tape. Barrier layers provided on a side surface of the sealing tape or inside the sealing tape parallel to a side surface increase the impermeability of the sealing tape with respect to the diffusion of water vapor in a functional direction defined between an interior of a room and an exterior of said room. A barrier layer of this type has a greater resistance to the diffusion of water vapor than the foam of the sealing tape and therefore has the ability to educe the diffusion of water vapor through the sealing tape.

It has been found that the permeability of a sealing tape with respect to water vapor should be considered over relatively long lengths of the sealing tape. Local differences in the water vapor diffusion resistance of the sealing tape, such as those which can occur as a result of manufacturing-related situations, lead to the diffusion of water vapor within the sealing tape in a direction toward areas of lower water vapor diffusion resistance. To reduce and/or suppress this type of water vapor diffusion in a longitudinal direction of the sealing tape inside the sealing tape, sealing tapes can be provided with additional barrier layers. These additional barrier layers are substantially parallel to the functional direction of the sealing tape and extend between the side surfaces of the sealing tape which face the room interior and the room exterior and are thus, in a wound up configuration of the sealing tape, situated between the end surfaces of a sealing tape roll. Barrier layers of this type subdivide the sealing tape into a plurality of sealing tape sections arranged in a row, one behind the other, in the longitudinal direction of the sealing tape, wherein adjacent sealing tape sections are from each other by a barrier layer.

Known methods for producing a sealing tape with longitudinally extending barrier layers are not adapted, or adapted to only a very limited extent, to the production of sealing tapes or sealing tape rolls with a plurality of internal barrier layers extending between the side surfaces of the sealing tape lying opposite each other or between the end surfaces of a corresponding sealing tape roll lying opposite each other.

For example, a method for producing sealing tape rolls with an internal barrier layer is described in US 2016/0059536 A1, in which a plurality of cuts extending in the longitudinal direction of the foam web are introduced and a barrier layer material is then inserted into each of the intermediate spaces created by these cuts.

However, sometimes it is difficult to introduce the barrier layer material reliably into very narrow intermediate spaces while ensuring that the material is distributed uniformly over the entire thickness of the foam web. After the barrier layer material has been introduced, it is possible only with great difficulty to verify that the barrier layer has been introduced properly.

SUMMARY OF THE INVENTION

It is an object of the present invention to provide a method for producing a sealing tape roll with a plurality of interior barrier layers which extend over at least 50% of the width of the sealing tape roll between the end surfaces of the sealing tape roll lying opposite each other, the method being easily to implement at low cost.

According to an aspect of the present invention, a method for producing a sealing tape roll with a plurality of interior barrier layers, each of which extends over at least 50% of a width of the sealing tape roll between opposite end surfaces of the sealing tape roll, comprises the following steps:

(a) providing a first foam web of flexible foam comprising a top surface, a bottom surface, and two side surfaces connecting the top surface and the bottom surface to each other, wherein a longitudinal direction is defined parallel to the bottom surface and parallel to the side surfaces, and a transverse direction is defined parallel to the bottom surface and perpendicular to the longitudinal direction;

(b) applying a first barrier layer to a first surface of the first foam web to form a laminated foam web, wherein the first surface corresponds to the top surface or to the bottom surface of the first foam web, and a second surface corresponds to the respective other one of the top surface and the bottom surface of the first foam web;

(c) introducing a plurality of first cuts into a top surface of the laminated foam web in the transverse direction and introducing a plurality of second cuts into a bottom surface of the laminated foam web in the transverse direction to form strips arranged behind each other in a row in the longitudinal direction, wherein each of the second cuts is longitudinally offset from one of the first cuts, and wherein a connecting section remains between two adjacent strips;

(d) folding over the strips in an area of the connecting sections to produce a foam-barrier layer web such that subsections of the top surface of the laminated foam web, which are adjacent to a common connecting section, lie opposite each other, and subsections of the bottom surface of the laminated foam web, which are adjacent to a common connecting section, lie opposite each other; and (e) forming the sealing tape roll by
  (i) winding up the foam-barrier layer web around a rotational axis to form the sealing tape roll, or
  (ii) winding up the foam-barrier layer web around a rotational axis to form an intermediate roll and cutting through the intermediate roll at one or more axially adjacent points to produce a plurality of sealing tape rolls, which are narrower than the intermediate roll; or
  (iii) introducing at least one cut into the foam-barrier layer web in a longitudinal direction of the foam-barrier layer web to form foam-barrier layer strips and winding up the foam-barrier layer strips around a rotational axis to form individual sealing tape rolls.

In this way it is possible to produce a sealing tape roll reliably, easily, and at low cost. In particular, the first barrier layer can be applied to a large area of the top surface or the bottom surface of the first foam web, preferably to the entire surface. The corresponding surface of the first foam web is easy to access and to observe during the production process. The applied barrier layer can be evaluated with respect to its quality before carrying out any further steps of the method, so that, if the barrier layer has not been applied properly, it is possible to intervene in the process on an early stage and correct any error quickly. To produce the sealing tape roll in accordance with the first aspect of the invention, there is no need for a complicated and difficult-to-monitor step of introducing barrier layer material into cuts in a sealing tape or in a foam web or for a step of preparing a plurality of sealing tape sections provided with a barrier layer material. After the first barrier layer has been applied, the only steps then required are to cut partially through the laminated foam web, alternating between its top surface and its bottom surface, and to fold over the strips thus obtained. As a result, subsections of the barrier layer formed by the cuts become automatically arranged in the interior of the foam-barrier layer web.

Proceeding from the foam-barrier layer web thus formed, the skilled person will see a number of different ways in which one or more sealing tape rolls of the desired configuration can be produced from it. First, the foam-barrier layer web can be wound up directly into a sealing tape roll (variant i), as a result of which no further steps are required. In this case, the foam-barrier layer web already corresponds to a sealing tape. However, according to the first aspect of the invention, it is exceptionally easy to form foam-barrier layer webs which are considerably wider than the sealing tapes or sealing tape rolls to be produced. From such a foam-barrier layer web, a plurality of sealing tape rolls of the desired width can then be produced. The production method is especially effective in this case. In one embodiment, the foam-barrier layer web can be wound up into an intermediate roll, which is then cut into a plurality of sealing tape rolls (variant ii). Each of the strips formed by the cutting operation then forms a sealing tape. Cutting of the intermediate roll provides the advantage that the surfaces produced by cutting the intermediate roll into individual sealing tape rolls turn out to be exceptionally flat. According to variant (iii), the foam-barrier layer web can also be divided into a plurality f foam-barrier layer strips by introducing at least one cut. These strips are then wound up into individual sealing tape rolls. Each of these foam-barrier layer strips then corresponds to a sealing tape. In this case as well, a plurality of sealing tape rolls can be effectively produced from a wide foam-barrier layer web, as previously described.

Sealing tape rolls also offer the advantages of space-saving storage, ease of transport, and ease of handling the sealing tape rolls. The sealing tape, the foam-barrier layer web, or the foam-barrier layer strips are therefore preferably compressed as they are being wound up into the sealing tape roll. According to an embodiment of the present invention, a compressed thickness of the sealing tape in the sealing tape roll is less than 25% of an original thickness of the foam. In preferred embodiments, the sealing tape has a compressed thickness of less than 20%, even more preferably of less than 15% and/or greater than 5% of the original thickness of the foam.

In an expanded state, the sealing tape preferably comprises a substantially rectangular cross section. A "width" of the sealing tape is defined as a distance between the side surfaces of the sealing tape; a "thickness" of the sealing tape is defined as a distance between the top surface and the bottom surface; and a "length" of the sealing tape is defined as a distance in the longitudinal direction. In a cross section perpendicular to the longitudinal direction, the top and bottom surfaces form wide sides of the sealing tape, and the side surfaces, in this cross section, form narrow sides of the sealing tape. It is preferred that the sealing tape be considerably longer than it is wide and than it is thick. The rotational axis around which the sealing tape, the foam-barrier layer strip, or the foam-barrier layer web is wound up into the sealing tape roll is preferably parallel to the transverse direction. The side surfaces of the sealing tape then form end surfaces of the sealing tape roll. A width of the sealing tape roll is then substantially the same as the width of the sealing tape. Slight deviations can occur when the side surfaces bulge outward slightly after the sealing tape roll has been wound up under compression. Such deviations are not considered when a range (in %) within which the plurality of the barrier layers extend across the width of the sealing tape and of the sealing tape roll is stated. If the plurality of barrier layers extend over the entire width of the sealing tape roll, they also extend over the entire width of the sealing tape and vice versa.

An "installed state" of the sealing tape is defined as a state in which the sealing tape is arranged in a joint between a frame element, a window or door frame, and a building wall. In this case, the longitudinal direction of the sealing tape extends along the joint around a periphery of the frame, and the sealing tape rests flat by its bottom and top surfaces against the frame element and the building wall. One side surface of the sealing tape then faces the interior of the room, and the opposite side surface faces the exterior of the room.

A "functional direction" of the sealing tape is defined as a direction in which the sealing tape insulates and seals the interior of the room from the exterior of the room in an area of the joint. The functional direction therefore extends between the interior and the exterior of the room and is perpendicular to the side surfaces of the sealing tape and parallel to the bottom surface of the sealing tape. The functional direction is therefore also perpendicular to the longitudinal direction of the sealing tape.

The sealing tape also comprises a plurality of sealing tape sections, which, after the sealing tape has been unwound, are arranged behind each other in a row in the longitudinal direction, wherein a barrier layer of the plurality of barrier layers is arranged between every pair of adjacent sealing tape sections of the plurality of sealing tape sections. The sealing tape sections are formed by the folded-over strips of the foam-barrier layer web, which, in certain cases (variants ii and iii), were furthermore cut through to produce the sealing tape. The plurality of barrier layers extend over at least 50% of the width of the sealing tape roll between the opposite end surfaces of the sealing tape roll. The barrier layers arranged in a row in the longitudinal direction of the sealing tape therefore influence the diffusion of water vapor and/or the permeability to air within the sealing tape in the longitudinal direction of the sealing tape between the individual sealing tape sections. The effect of inhomogeneities of the foam material of the sealing tape can therefore be limited to a small local area. The diffusion of water vapor within the sealing tape in the longitudinal direction of the sealing tape can be suppressed at least to a considerable degree.

To enhance the effect described above, the plurality of barrier layers extend over at least 50%, preferably over at least 75%, more preferably over at least 90% of the width of the sealing tape between the opposing end surfaces of the sealing tape roll. In a preferred embodiment, the plurality of barrier layers extend continuously from one end surface of the sealing tape roll to the opposite end surface of the sealing tape roll. The plurality of barrier layers furthermore preferably extend over at least 50%, more preferably over at least 75%, and even more preferably over at least 90% of the thickness of the sealing tape in the expanded state between its top surface and its bottom surface.

The greater the distance over which the plurality of barrier layers extend between the end surfaces of the sealing tape roll and thus between the side surfaces of the sealing tape, the more completely the sealing tape sections arranged behind each other in a row are separated from each other. The diffusion of water vapor within the sealing tape in the longitudinal direction can thus be increasingly reduced. In particular, water vapor is increasingly prevented from diffusing around the plurality of barrier layers.

The plurality of barrier layers can extend from one end surface of the sealing tape roll toward the opposite end surface. The plurality of barrier layers, however, can also extend between the end surfaces of the sealing tape roll in such a way that lateral edges of the barrier layers facing the end surfaces are a certain distance away from the end surfaces.

The barrier layers described here are preferably formed of a film-like material or an adhesive, particularly out of a strip of film, a strip of adhesive tape, or an adhesive-like fluid medium. Such barrier layer materials can be applied and bonded to the foam of the sealing tape particularly easily, and the application process can be easily monitored. In addition, these materials are particularly well adapted to serve as barrier layer material, because their sealing properties can be adjusted as desired.

For example, the barrier layers described herein consist of a film-like material, e.g., a film of polyamide, polyurethane, polypropylene, or copolymers thereof. The barrier layers described herein can also be formed of an adhesive, e.g., a dispersion adhesive, particularly an acrylate adhesive. All barrier layers can be formed of the same material or can be made of different materials.

The barrier layers can also be configured with the property of "humidity variability"; that is, their resistance to the diffusion of water vapor changes as a function of the atmospheric humidity of the environment of the barrier layer. The so-called "sD" value is characteristic of the water vapor diffusion resistance; it is the water vapor diffusion value relative to the thickness of a layer of air in meters.

In one embodiment, the sealing tape or the sealing tape roll also comprises an additional material, which is applied to a surface of the sealing tape or to the plurality of barrier layers or which is contained in the impregnating agent. The additional material can give the sealing tape special properties. Additional materials, which can be considered for use, include in particular materials for fire protection (e.g., expandable graphite, incombustible solids, $CO_2$ emitters, etc.), materials for insulation (e.g., polyurethane foam, resins, sealants, etc.), materials for sealing against moisture (e.g., hydrophobic or hydrophilic substances, substances which swell upon contact with water, etc.), materials for sound damping, materials for controlled ventilation catalysts, etc.), materials for hygienic purposes (e.g., disinfectants, etc.), and/or materials for initiating the expansion of the sealing tape (e.g., blowing agents, heat sources, etc.). With respect to the arrangement, the nature and properties of the additional material, the skilled person will be able to envision various alternatives which can be employed to satisfy the requirements in specific cases.

The foam of the foam webs can be formed of any desired open-cell or closed-cell flexible foam such as, for example, polyurethane, polyethylene, polyvinyl chloride, or polypropylene foam, and can be impregnated to delay its recovery after compression. The density of these types of flexible foams is in the range of 20-200 kg/m$^3$.

In a preferred embodiment, step (b) further comprises the application of a second barrier layer to the second surface of the first foam web. As a result, by folding over the strips in the area of the connecting sections, not only subsections of the first barrier layer but also subsections of the second barrier layer become arranged in the interior of the foam-barrier layer web. In this way, either sealing tape rolls having a larger number of interior barrier layers can be produced and/or a larger number of sealing tape rolls can be produced from the foam-barrier layer web. The second barrier layer can be formed out of the same material as the first barrier layer. The second barrier layer, however, can also consist of a material different from that of the first barrier layer for the purpose of providing additional variations in, or adjustments to, the properties of the sealing tapes to be produced.

It is preferred that step (a) also comprises providing at least one additional foam web of flexible foam and that step (b) of forming a laminated foam web of multiple plies further includes arranging the at least one additional foam web in such a way that a second surface and a first surface of two adjacent foam webs lie opposite each other; and arranging at least one barrier layer between two adjacent foam webs.

In this way, laminated foam webs are formed which consist of several foam webs and barrier layers arranged on top of each other in alternating fashion. It is particularly preferred in this case that a first barrier layer is applied to the top surface of a first foam web; a second foam web is supplied and arranged in such a way that its bottom surface is adjacent to the top surface of the first foam web provided with the first barrier layer; an additional barrier layer is applied to the top surface of the second foam web; and a third foam web is supplied and arranged in such a way that a bottom surface of the third foam web is adjacent to the top surface of the second foam web provided with the additional barrier layer. In this way, it is possible to continue with as many foam webs and barrier layers as desired in order to produce a laminated foam web of any desired size, in which foam webs and barrier layers are arranged on top of each other in alternating fashion.

If first and second cuts according to step (c) of the method according to the first aspect of the invention are introduced into a multi-ply laminated foam web, the strips thus formed comprise a plurality of foam strips and barrier layer strips arranged on top of each other. If the strips are then folded over according to step (d), they form sealing tape sections which comprise even more barrier layer sections in addition to the subsections of the first and, if present, of the second barrier layer arranged in the area of the connecting sections. The number of interior barrier layers can thus be increased without significantly increasing the complexity of and efforts involved in the production method. The method thus acquires a more effective character.

The method preferably further comprises the step of bonding the first foam web to the at least one additional foam web at the first and second surfaces facing each other. More preferably, each pair of adjacent foam webs is bonded together in the area of their facing first and second surfaces in the case of a multi-ply laminated foam web of any desired size. The foam webs can be bonded by additional bonding alternatives such as adhesives or adhesive tapes or the like, which are applied to at least one of the two facing first and second adjacent surfaces. It is also possible, however, to apply an adhesive layer to the side surfaces of the foam webs, so that adjacent foam webs are connected to each other by their side surfaces. In addition, it is possible for adjacent foam webs to be connected to each other by the barrier layer being arranged between them. For this purpose, the barrier layer can itself have a certain adhesive property, or it can be provided on one or both sides with an adhesive, or it can be partially melted by the action of heat, so that it becomes bonded to the foam webs. Pressure is preferably also exerted on the surfaces to be bonded. As a result of the bonding the adjacent foam webs to each other, the cohesion of the multi-ply laminated foam web is increased; and, after folding-over the strips, the cohesion of the foam-barrier layer web or of the produced sealing tapes is also increased. This is also advantageous with respect to the handling of the individual components during subsequent steps of the method.

According to a preferred embodiment, the method further comprises the application of a barrier layer to at least a first or second surface of an exterior foam web facing away from the other foam webs. That is, in the case of a multi-ply laminated foam web as well, at least one barrier layer is applied to the top surface or the bottom surface of this multi-ply laminated foam web. Preferably, a barrier layer is applied to both, the top surface and the bottom surface of the laminated foam web. Each of these barrier layers is then comprised in a connecting section between two adjacent strips. In addition, the number of interior barrier layer sections is thus increased even more.

A first cut and a second cut are preferably introduced into the laminated foam web so that they alternate when considered in the longitudinal direction. It is particularly preferred that the plurality of first cuts and the plurality of second cuts be introduced at uniform distances from each other in the longitudinal direction of the laminated foam web to produce strips of equal width. This makes it possible, first, to produce a substantially flat foam-barrier layer web, which is particularly adapted to the further steps of processing. Second, if the individual sealing tape sections formed by the strips all have substantially the same dimensions, the sealing tapes to be produced are provided with homogeneous insulating and sealing properties.

By introducing the first and second cuts to different depths, the configuration of the sealing tapes or of the foam-barrier layer web can be varied. A distinction is to be made in particular between whether a cut passes all the way through the foam webs, which means that a connecting section between two adjacent strips is formed only by the barrier layer arranged on one of the two adjacent surfaces, i.e., on the first or second surface, or whether a cut does not pass completely through the foam webs, so that the connecting section also comprises a bridge of foam material.

If the connecting sections are formed only by the first barrier layer and the second barrier layer, these layers form a kind of hinge joint in the area of the connecting sections, which joint connects the two adjacent strips to each other in an articulated manner. A foam bridge between the adjacent strips also forms a hinge joint of this type. It must be taken into consideration, however, that, the thicker the foam bridge, the greater the difficulty of folding over the strips in the area of the connecting sections afterwards. As a function of its thickness, a foam bridge creates resistance to the folding-over of the strips. If such foam bridges are provided, they should be thinner than the foam webs being used. The foam bridges preferably have a thickness of no more than 10 mm, more preferably of no more than 5 mm, and even more preferably of no more than 1-2 mm. The foam bridges are advantageous, however, inasmuch as they protect the first and/or the second barrier layer from damage when the plurality of first and second cuts are introduced and guarantee a greater cohesion of the strips in the longitudinal direction.

It is inherently possible to conceive of various combinations of the depths to which the first and second cuts can be made. Preferred embodiments of such combinations are described in the following.

In one embodiment, the plurality of first cuts pass all the way through the first foam web, so that the plurality of connecting sections in the area of the second surface are formed by the second barrier layer alone. The plurality of second cuts do not pass all the way through the first foam web, so that the plurality of connecting sections in the area of the first surface comprise a foam bridge.

In another embodiment, the plurality of first cuts do not pass all the way through the first foam web, so that the plurality of connecting sections in the area of the second surface comprise a foam bridge. The plurality of second cuts pass all the way through the first foam web, so that the plurality of connecting sections in the area of the first surface are formed by the first barrier layer alone.

In yet another embodiment, neither the plurality of first cuts nor the plurality of second cuts pass all the way through the first foam web, so that the plurality of connecting sections in the area of the first surface comprise a foam bridge, and the plurality of connecting sections in the area of the second surface also comprise a foam bridge.

Alternatively, the plurality of first cuts and the plurality of second cuts each pass all the way through the first foam web, so that the plurality of connecting sections in the area of the first surface are formed by the first barrier layer alone, and the plurality of connecting sections in the area of the second surface are formed by the second barrier layer alone.

The previously described possibilities for the depth of the plurality of first and second cuts relate to the exemplary embodiment in which the laminated foam web comprises only the first foam web. It is obvious that these exemplary embodiments are applicable to a multi-ply laminated foam web in an analogous manner as well. The connecting sections are in this case formed in the area of a top surface and a bottom surface of the multi-ply laminated foam web. Accordingly, the connecting sections optionally comprise a barrier layer section of the barrier layer applied to the top surface and/or to the bottom surface of the multi-ply laminated foam web and optionally a foam bridge, which is formed in the uppermost or lowermost foam web of the multi-ply laminated foam web.

The method preferably comprises the step of connecting the subsections of the first surface of the strips lying opposite each other and being provided with a barrier layer after these strips have been folded over and similarly comprises the step of connecting the subsections of the second surface lying opposite each other and being provided with a barrier layer. As a result of connecting the strips after the folding-over step, the cohesion of the strips is increased even beyond that of the connection produced by the connecting sections. Both, the produced foam-barrier layer web and the subsequently produced sealing tapes and sealing tape rolls thus acquire a more stable form.

According to another aspect of the present invention, the method for producing a sealing tape roll with a plurality of interior barrier layers, each of which extends over at least 50% of a width of the sealing tape roll between opposite end surfaces of the sealing tape, comprises the following steps:

(a) providing a first foam web of flexible foam comprising a top surface, a bottom surface, and two side surfaces connecting the top surface and the bottom surface to each other, wherein a longitudinal direction of the first foam web is defined parallel to the bottom surface and parallel to the side surfaces, and a transverse direction is defined parallel to the bottom surface and perpendicular to the longitudinal direction;

(b) applying a first barrier layer to a first surface of the first foam web to form a laminated foam web, wherein the first surface corresponds to the top surface or to the bottom surface of the first foam web, and a second surface corresponds to the respective other one of the top surface and the bottom surface of the first foam web;

(c) introducing a plurality of cuts into the laminated foam web in the transverse direction, these cuts passing completely through the laminated foam web, to form strips arranged behind each other in a row in the longitudinal direction;

(d) folding over each strip around a folding axis to produce a foam-barrier layer web, such that subsections of the top surface of the laminated foam web and subsections of the bottom surface of the laminated foam web are arranged in the interior of the foam-barrier layer web, wherein the folding axis extends in the transverse direction;

(e) forming the sealing tape roll by:
  (i) winding up the foam-barrier layer web around a rotational axis into the sealing tape roll;
  (ii) winding up the foam-barrier layer web around a rotational axis into an intermediate roll and cutting through the intermediate roll at one or more axially adjacent points to produce a plurality of sealing tape rolls, which are narrower than the intermediate roll; or
  (iii) introducing at least one cut into the foam-barrier layer web in a longitudinal direction of the foam-barrier layer web to form foam-barrier layer strips and winding up the foam-barrier layer strips around a rotational axis into individual sealing tape rolls.

The method according to this second aspect of the present invention differs from the first aspect substantially in that the introduced cuts pass all the way through the laminated foam web. The strips thus formed are therefore not connected to each other by a connecting section, as is the case according to the first aspect. This offers in particular the advantage that the work of introducing the cuts can be carried out with less precision, because there is no need to form a very thin foam bridge, the thickness of which can change considerably as a result of very small variations in the cutting depth, and also because there is no danger that the barrier layer arranged in the area of a connecting section could be damaged unintentionally. The method can therefore be implemented with greater ease, reliability, and speed.

Step (b) preferably further comprises the application of a second barrier layer to the second surface of the first foam web, wherein the plurality of cuts also pass completely through the second barrier layer.

Finally, it is preferred that the method comprise the step of connecting adjacent strips of the foam-barrier layer web to each other between step (d) and step (e). As a result, the cohesion of the strips in a longitudinal direction of the foam-barrier layer web is established. Connecting the strips is preferably accomplished by the barrier layer sections arranged between the strips, as described in connection with the first aspect of the invention. In particular, connecting the strips preferably comprises heating of the strips before or after the folding-over step. Connecting adjacent strips can also be accomplished by, for example, applying a layer of adhesive to the top surface and/or to the bottom surface of the foam-barrier layer web. The step of connecting, however, can also comprise the application of an adhesive layer to the side surfaces of the foam-barrier layer web. If connecting the adjacent strips comprises the application of an adhesive layer to the side surfaces of the foam-barrier layer web, it is also preferred that this adhesive layer simultaneously forms a barrier layer. A barrier layer of this type is then oriented in the longitudinal direction and preferably forms an end surface of the sealing tape roll to be obtained.

BRIEF DESCRIPTION OF THE DRAWINGS

FIG. 8c shows an isometric view of the step of cutting through an intermediate roll formed from the foam-barrier layer web to produce a plurality of sealing tape rolls in another alternative embodiment.

DETAILED DESCRIPTION OF SPECIFIC EMBODIMENTS

Figure 1:
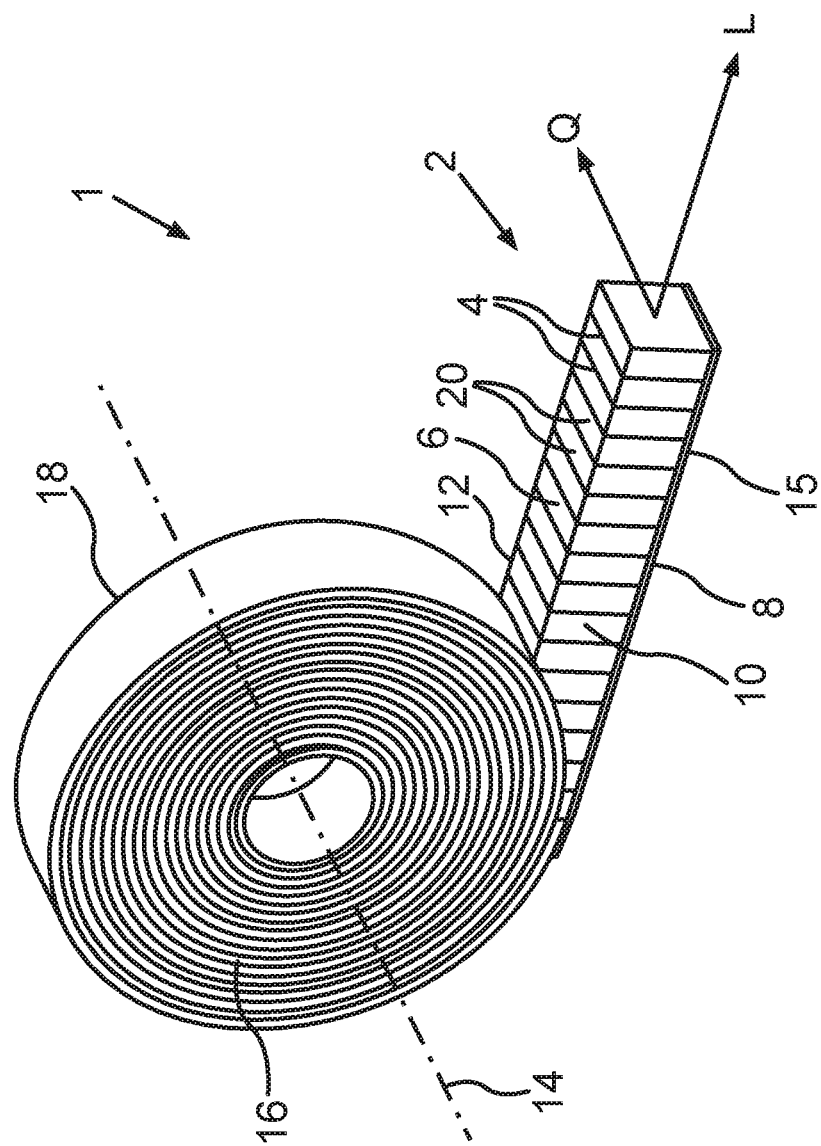
FIG. 1 shows an isometric view of an embodiment of a sealing tape roll produced by a method according to the invention.

FIG. 1 shows an isometric view of a sealing tape roll 1. The sealing tape roll 1 comprises a wound-up sealing tape 2. The sealing tape 2 in FIG. 1 has been partially unwound from the sealing tape roll 1, wherein one end of the sealing tape 2, i.e., the end on the outside relative to the sealing tape roll 1, is no longer wound up into the sealing tape roll 1. In the embodiment shown, the part of the sealing tape 2 which has been unwound has already returned to an expanded state from a compressed state in a direction perpendicular to the longitudinal direction L of the sealing tape 2. The thickness of the sealing tape 2 in the expanded state is usually 2-times to 20-times the thickness of the sealing tape 2 in the compressed state, in which it is wound-up into the sealing tape roll 1.

The sealing tape 2 comprises a flexible, compressible foam and a plurality of internal barrier layers 4. The sealing tape 2 also comprises a top surface 6, a bottom surface 8, and two side surfaces 10, 12, which connect the top surface 6 and the bottom surface 8 to each other. The longitudinal direction L of the sealing tape 2 is parallel to the bottom surface 8 and to the side surfaces 10, 12. In the unwound state of the sealing tape 2, the tape 2 lies on a flat surface, such as the external surface of a frame element. In this state, the side surfaces 10, 12 are perpendicular to the top surface 6 and to the bottom surface 8, and the sealing tape 2 is in a completely expanded state. The sealing tape 2 is preferably wound up under compression into the sealing tape roll 1, so that the sealing tape roll 1 can be stored in a smaller space. In the compressed state of the sealing tape 2, the height of the side surfaces 10, 12 is less than that in the expanded state of the sealing tape 2. That is, the distance between the top surface 6 and the bottom surface 8 in the compressed state is less than that in the expanded state. The distance between the side surfaces 10, 12 remains substantially unchanged when the sealing tape 2 is compressed. A width of the sealing tape 2 between the side surfaces 10, 12 therefore substantially corresponds to a width of the sealing tape roll 1 between its end surfaces 16, 18.

The sealing tape 2 is wound-up into the sealing tape roll 1 around a rotational axis 14, which is preferably parallel to a transverse direction Q of the sealing tape 2. The transverse direction Q is parallel to the bottom surface 8 of the sealing tape 2 and perpendicular to the longitudinal direction L of the sealing tape 2. If the sealing tape 2 has a substantially rectangular cross section, the transverse direction Q is also perpendicular to the side surfaces 10, 12 of the sealing tape 2. Within the sealing tape roll 1, the top surface 6 of one turn rests against the bottom surface 8 of an adjacent turn of the sealing tape roll 1, and the side surfaces 10, 12 of the sealing tape 2 form end surfaces 16, 18 of the sealing tape roll 1. The sealing tape 2, furthermore, is wound-up into the sealing tape roll 1 in such a way that the bottom surface 8 is oriented radially toward the outside relative to the rotational axis 14, i.e., relative to the sealing tape roll 1, whereas the top surface 6 of the sealing tape 2 is oriented radially toward in the inside. The bottom surface 8 of the outermost turn of the sealing tape 2 of the sealing tape roll 1 thus forms a circumferential surface of the sealing tape roll 1.

The bottom surface 8 of the sealing tape 2 preferably comprises an adhesive layer 15 for attaching the sealing tape 2 to a frame element. For example, this adhesive layer 15 can be formed by a double-sided adhesive tape, which is attached to the bottom surface 8 of the sealing tape 2 by an adhesive surface. An opposite adhesive surface of the adhesive tape 15 facing away from the bottom surface 8 is covered by a cover layer to protect the adhesive surface and to prevent the individual turns of the sealing tape roll 1 from sticking together. To install the sealing tape 2, a cover layer of this type is to be peeled off the adhesive layer 15 in sections, and the sealing tape roll 1 is to be unrolled along an exterior surface of the frame element. The cover layer consists, for example, of silicone paper. It is also possible to cut off sealing tape strips of a desired length from the sealing tape roll 1 first and to then fasten said strips to the frame element.

The sealing tape 2 comprises a plurality of sealing tape sections 20, which, in the unwound state of the sealing tape 2, are arranged in a row, one behind the other, in the longitudinal direction L. Between every two adjacent sealing tape sections 20 of the plurality of sealing tape sections 20, a barrier layer 4 of the plurality of barrier layers 4 is arranged. As a result, it is possible for water vapor to diffuse in the longitudinal direction L of the sealing tape 2 within the sealing tape 2 substantially only through at least one of the barrier layers 4.

The sealing tape 2 is installed in a conventional and intended manner, according to which the bottom surface 8 of the sealing tape 2 is attached to an exterior side of a frame element which is then arranged within a wall opening of a building wall, the frame element and building wall forming a joint to be sealed between them. Within the sealing tape 1, the plurality of barrier layers 4 extend between the end surface 16 and the opposite end surface 18 of the sealing tape roll 1, preferably continuously from the end surface 16 to the opposite end surface 18. Thus, in the installed state of the sealing tape, the barrier layers 4 extend from the interior side of the room to the exterior side of the room. The barrier layers 4 do not, however, extend around the peripheral joint in the longitudinal direction of the sealing tape 2.

The plurality of barrier layers 4 can also extend over only a portion of the width of the sealing tape 1 between the end surfaces 16, 18 and/or a portion of the thickness of the sealing tape 2 between the top surface 6 and the bottom surface 8. To achieve the desired effect on water vapor diffusion within the sealing tape 2, the plurality of barrier layers 4 extend over at least 50% of the width of the sealing tape roll 1 and over at least 50% of the thickness of the sealing tape 2. Because it is possible in this case for water vapor to diffuse around the barrier layer in question with substantially no hindrance, the areas in which no barrier layer is provided should be made as small as possible or avoided entirely. Each barrier layer 4 therefore extends over at least 50%, preferably over at least 75%, and even more preferably over at least 90%, of the width of the sealing tape 2 between the side surfaces 10, 12 or of the width of the sealing tape roll 1. Further, each barrier layer 4 preferably extends over at least 50%, more preferably over at least 75%, and even more preferably over at least 90%, of the thickness of the sealing tape 2 between the top surface 6 and the bottom surface 8. It is particularly preferred that each barrier layer 4 extends continuously between the side surfaces 10, 12 of the sealing tape 2 and over at least 90% of the thickness of the sealing tape 2.

In the preferred embodiment according to FIG. 1, the plurality of barrier layers 4 are perpendicular to the top surface 6, to the bottom surface 8, and to the side surfaces 10, 12. The barrier layers 4 thus extend axially through the sealing tape roll 1. More precisely, each barrier layer 4 forms a plane, which comprises both a radial and an axial component relative to the sealing tape roll 1 and its rotational axis 14.

The sealing tape sections 20 adjacent to a barrier layer 4 are in this exemplary embodiment connected by the barrier layer 4 itself, e.g., they are adhered to it. It is also possible, however, to provide a layer of an adhesive, such as the adhesive layer 15 on the bottom surface 8 of the sealing tape 2, to connect the sealing tape sections 20 to each other in the longitudinal direction L. A corresponding adhesive layer, however, can also be arranged, either alternatively or supplementally, on the top surface 6 or on one of the side surfaces 10, 12.

A method for producing a sealing tape roll 1 according to FIG. 1 is described in the following under reference to FIGS. 2-8.

Figure 2:
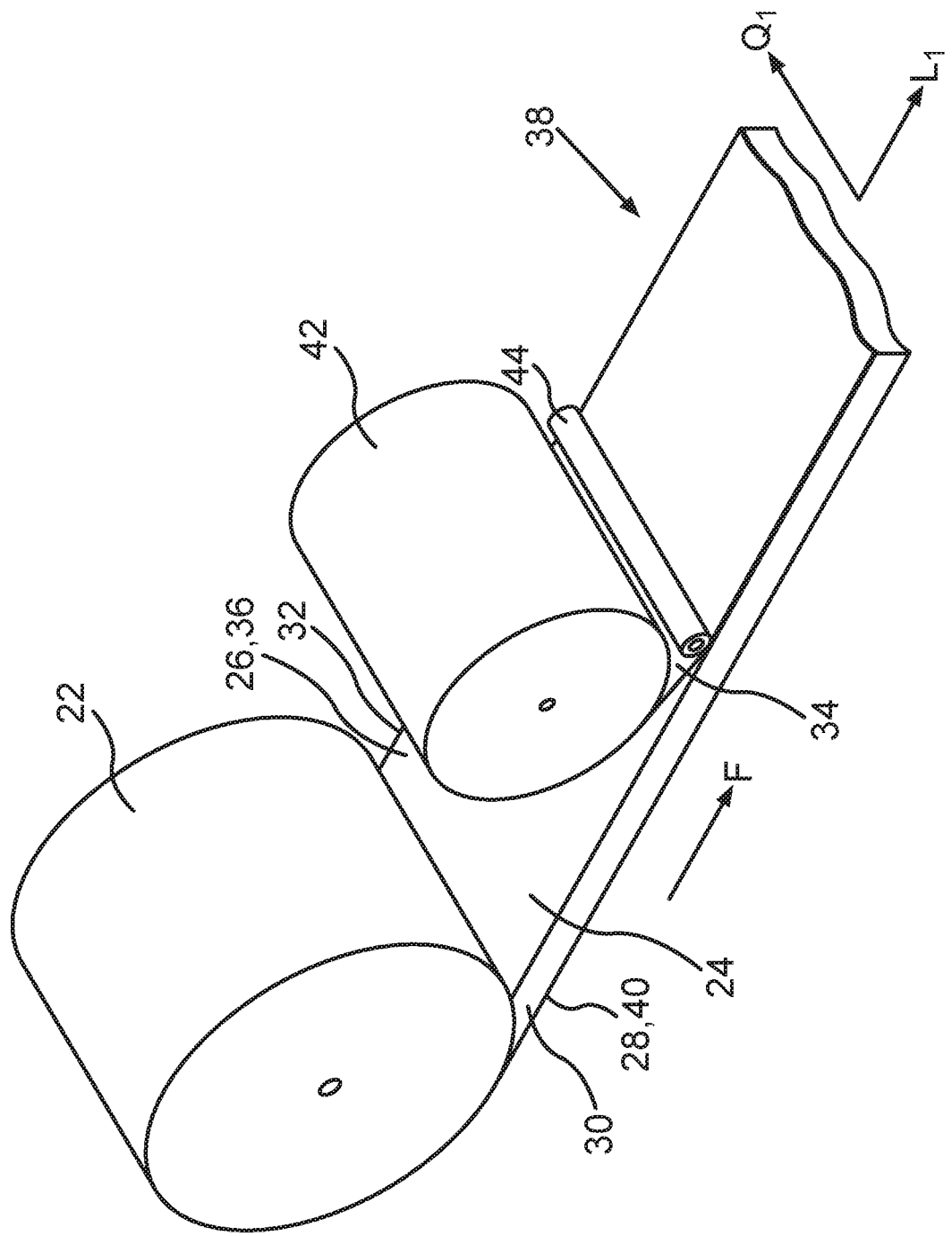
FIG. 2 shows, by way of example, the step of applying a first barrier layer to a first surface of a first foam web.

FIG. 2 shows first steps of an exemplary embodiment of a method according to the invention for producing a sealing tape roll 1. A flexible foam in the form of a wound-up, first foam web 24 is provided on a starting roll 22. The first foam web 24 preferably comprises a substantially rectangular cross section with a top surface 26, a bottom surface 28, and two side surfaces 30, 32, which connect the top surface 26 and the bottom surface 28 to each other. A longitudinal direction L1 of the first foam web 24 is parallel to the bottom surface 28 and to the side surfaces 30, 32. A transverse direction Q1 of the first foam web is parallel to the bottom surface 28 and perpendicular to the longitudinal direction L1 of the first foam web 24. A width of the first foam web 24 is defined as a distance between the side surfaces 30, 32, and a thickness of the first foam web 24 is defined as a distance between the top surface 26 and the bottom surface 28. The web-like shape of the first foam web 24 is obtained in particular in that the width of the foam web 24 is considerably greater than the thickness of the foam web. A length of the foam web 24 in the longitudinal direction L1 is in turn much greater than the width and than the thickness of the foam web. The first foam web 24 can be provided on the starting roll 22 in considerable lengths of up to 500 m, preferably in lengths in the range of 3-300 m, and more preferably in lengths in the range of 5-200 m. The width of the first foam web 24 is preferably in the range between 1 cm and 5 m, preferably in the range of 0.5-1.5 m. The thickness of the foam web 24 in the relaxed state is preferably in the range between 5 mm and 30 cm, preferably between 10 mm and 10 cm.

Because it is provided in the form of a starting roll 22, the first foam web 24 can be transported and processed easily. The first foam web on the starting roll 22 is preferably in an uncompressed or only slightly compressed state. It is also possible that the first foam web 24 on the starting roll 22 could be in a compressed state, but then it must be ensured during the course of the process that, after the web has been unwound from the starting roll 22, the foam material has sufficient time to recover.

To cover various exemplary embodiments, reference is also made in the following to a "first surface" and to a "second surface" of a web such as the first foam web 24. In general, the "first surface" corresponds to the top surface or to the bottom surface of the web in question, and the "second surface" corresponds to the respective other one of the top surface and the bottom surface of the same web.

After the first foam web 24 has been unwound from the starting roll 22, it is moved along in a conveying direction, indicated by the arrow F. The conveying direction F is parallel to the longitudinal direction L1 of the foam web 24.

Then a first barrier layer 34 is applied to a first surface 36 of the first foam web 24 to form a laminated foam web 38. In the exemplary embodiment shown here, the first surface 36 corresponds to the top surface 26 of the first foam web 24.

In a preferred embodiment, after the web has been unwound from the starting roll 22, a second barrier layer (not shown) can be applied to a second surface 40 of the first foam web 24, opposite the first surface 36, in an analogous manner. The second surface 40 corresponds in the present case to the bottom surface 28 of the foam web 24. This embodiment is preferred, because by the simple step of providing the second barrier layer the number of interior barrier layers in the final sealing tape 2 or in the sealing tape roll 1 can be easily increased. The method for producing the sealing tape roll 1 is therefore described in the following with reference to an embodiment in which a first barrier layer 34 and a second barrier layer are provided. It is obvious that the method can also be carried out analogously even without the step of providing a second barrier layer.

In the embodiment shown in FIG. 2, the first barrier layer 34 is formed by a film web, which is provided on a film supply roll 42. The second barrier layer can also be formed by a film web provided on a film supply roll. The first barrier layer 34 configured as a film web is preferably applied to the first surface 36 of the first foam web 24 from above, and the second barrier layer will be applied to the second surface 40 of the first foam web correspondingly from below. The application of the first barrier layer 34 and optionally of the second barrier layer is usually carried out in the area of a bonding unit, which is illustrated schematically by the roller 44. The application of the first barrier layer 34 and optionally of the second barrier layer usually comprises the bonding of the barrier layer in question to the first foam web 24. The bonding step in turn preferably comprises a step of applying heat and/or a step of pressing the barrier layer and the first foam web 24 together. When a film web is used, bonding the film to the first foam web 24 in the bonding unit is preferably carried out by lamination, more preferably by thermal lamination.

The first barrier layer 34 and the second barrier layer can each be formed by a web of a single-sided or double-side adhesive tape. The adhesive side of an adhesive tape of this type is then usually provided with a peel-off film, which is removed shortly before the tape is to be applied to the first foam web 24. The first barrier layer 34 and the second barrier layer can also be formed by a film web which itself comprises a layer of adhesive tape or a solid layer of a hot-melt adhesive. Finally, an adhesive-like fluid medium can be applied by nozzles (e.g., a hot-melt nozzle flat nozzle, mixing nozzle) or by roller application (e.g., a transfer roller) to the first foam web 24 to form the first barrier layer 34 and the second barrier layer. Depending on the adhesive, the bonding to the first foam web can then occur, preferably in a bonding unit, wherein the adhesive is usually solidified. In general, both chemical and physical types of solidification can be used. Here, too, the bonding of the first barrier layer 34 or of the second barrier layer to the first foam web 24 may comprise a step of applying heat and/or a step of pressing the first barrier layer 34 or the second barrier layer and the first foam web together. It is also possible to apply a spray adhesive to one side of a film web and to use this combination as the first barrier layer 34 or second barrier layer. Finally, if the first foam web 24 has been partially melted on one side and then solidified again or if the first foam web 24 has a skin as a result of the manufacturing process, a skin of the foam material of the first foam web can itself serve as the barrier layer.

Each of the heat-applying steps mentioned above is carried out by a heating device, which is usually configured as a hot-air blower. Radiant heating can also be considered, such as, for example, heating by an infrared heater or a microwave heater.

It is also conceivable that the first barrier layer 34 and the second barrier layer could be applied only to parts of the corresponding first surface 36 or second surface 40. The first and second barrier layers could each also consist of multiple parts and cover the first and second surfaces 36, 40 completely or partially. For example, individual strips of a barrier layer could be applied in the longitudinal direction L1 to the first and/or the second surface 36, 40. It is also possible to use different materials for the first and second barrier layers. If the first or second barrier layer consists of multiple parts, these individual components of the first or second barrier layer can also consist of different materials. In this way, many different possibilities are provided for adapting the properties effectively to the given requirements.

It is also possible that a foam web 38 to which a first barrier layer 34 and/or a second barrier layer has already been laminated could be wound up into the starting roll 22.

It can be easily seen in FIG. 2 that, after the web has been unwound, the top surface 6 and the bottom surface 8 of the first foam web 24 extend over a large area and are readily accessible. It is therefore easy to apply a barrier layer material properly over these large areas. In addition, the barrier layer material continues to be readily accessible after it has been applied and can be easily inspected, so that the quality of the formed barrier layer can be effectively monitored. It is only after further steps of the process that the barrier layers are arranged inside a web or a strip and thus become increasingly difficult to access and to inspect.

It can also be desirable to apply an additional material (not shown), as described detail above. The additional material can be already bonded to the first barrier layer 34 and/or to the second barrier layer and thus be applied in one step along with the corresponding barrier layer to the first foam web 24. Alternatively, the additional material can be applied over the entire surface area or only stripwise to the first surface 36 and/or to the second surface 40 of the first foam web 24 even before the first barrier layer 34 and the second barrier layer are applied. The additional material can also be applied externally to the barrier layer in question, either over the entire surface area or only stripwise, after the first barrier layer 34 and the second barrier layer have been applied.

Figure 3:
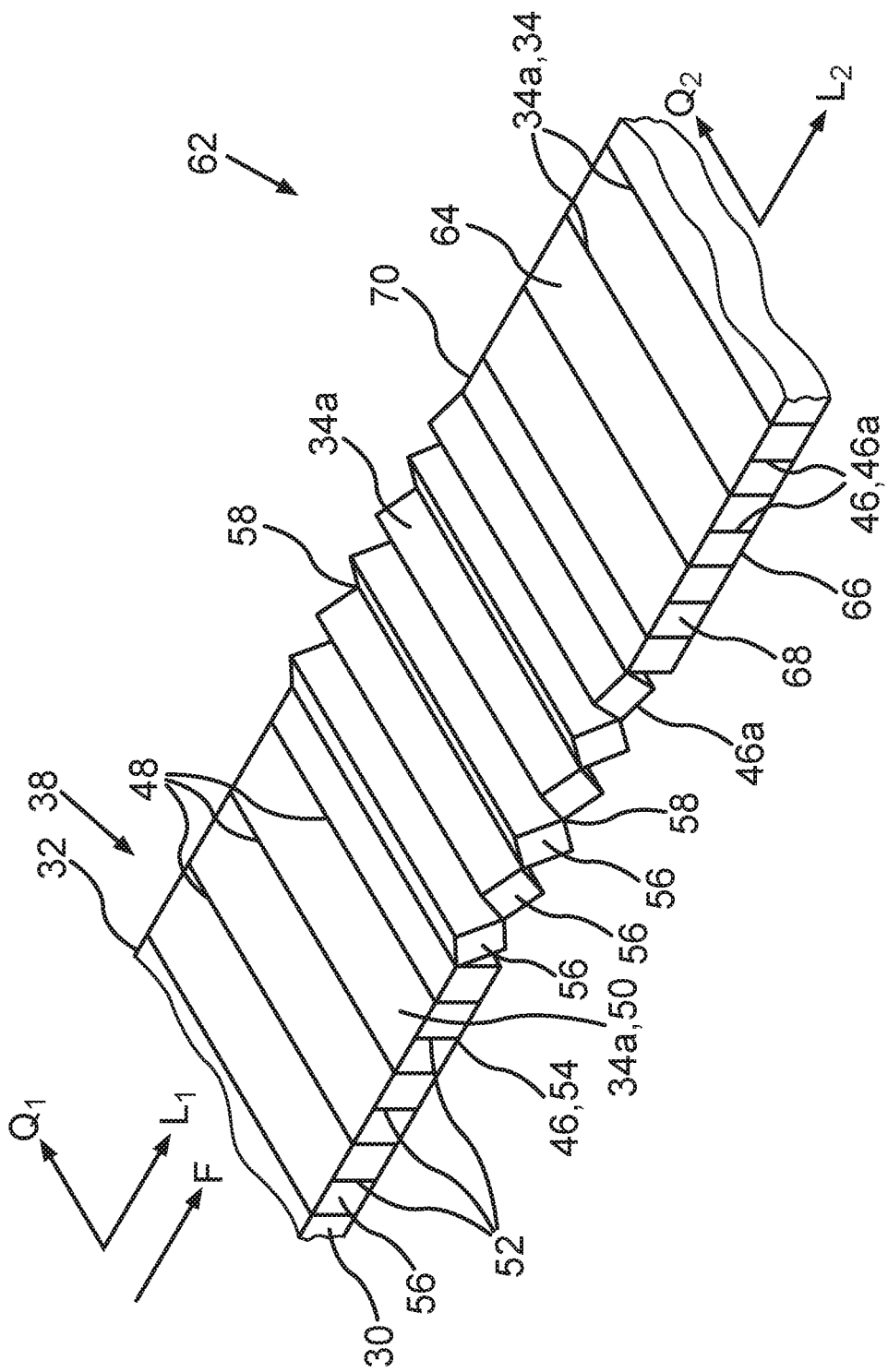
FIG. 3 shows, by way of example, the step of folding over strips to form a foam-barrier layer web according to a first aspect of the invention.

FIG. 3 illustrates additional processing steps according to a first aspect of the present invention.

A laminated foam web 38 formed according to FIG. 2 is sent onward to the further processing steps in the conveying direction F. The laminated foam web 38 comprises the first foam web 24, the first barrier layer 34, and preferably the second barrier layer 46, which has been applied to the second surface 40 of the first foam web 24. A plurality of first cuts 48 is introduced into the laminated foam web 38, namely, into the top surface 50 of the laminated foam web 38, in the transverse direction Q1. A plurality of second cuts 52 is introduced into a bottom surface 54 of the laminated foam web 38 in the transverse direction Q1. Each second cut 52 is introduced into the laminated foam web 38 with an offset in the longitudinal direction L1 from a first cut 48.

By introducing the plurality of first cuts 48 and the plurality of second cuts 52, a plurality of strips 56 of the foam web 38 is formed, which are arranged behind each other in a row in the longitudinal direction L1. In this embodiment, a connecting section 58 remains between each pair of adjacent strips 56. If the sections of the first surface 36 of the first foam web 24 in the area of the plurality of first cuts 48 are covered by the first barrier layer 34, this layer is cut through by the associated first cut 48 of the plurality of first cuts 48. Similarly, the plurality of second cuts 52 cut through the second barrier layer 46 if the second surface 40 of the first foam web 24 is covered by the second barrier layer 46 in the area of the plurality of second cuts 52. The plurality of first cuts 48 divides the first barrier layer 34 into a plurality of first barrier layer sections 34a. The plurality of second cats 52 divides the second barrier layer 46 into a plurality of second barrier layer sections 46a. Each strip 56 therefore comprises a foam strip 60, to which a first barrier layer section 34a is applied, and to which optionally a second barrier layer section 46a is applied.

A "first cut" is a cut which is introduced into the first surface of a foam web. A "second cut" is a cut which is introduced into the second surface of a foam web. Stating that a cut is either a "first" or a "second" is not intended to imply any chronological sequence in which the cuts are introduced into the respective foam web. For example, a second cut can be introduced even before a first cut is made. It is also possible for all the cuts to be introduced simultaneously into the foam web. The plurality of first cuts 48 and the plurality of second cuts 52 are introduced into the foam web in the transverse direction Q1 thereby extending from one side surface 30 to the opposite side surface 32 of the first foam web 24 or of the laminated foam web 38, i.e., transversely to the conveying direction F or the longitudinal direction L1. It is thus preferred that the laminated foam web 38 is standing still at the time of introducing the plurality of first and second cuts 48, 52. During this standing-still period, several cuts of the plurality of first cuts 48 and second cuts 52 are preferably introduced simultaneously into the laminated foam web 38 or quickly one after the other. Alternatively, it is possible that the plurality of first and second cuts 48, 52 are moving along with the laminated foam web 38 in the conveying direction F while they are introducing the associated cuts 48, 52. This can have disadvantageous effects, however, on the quality of the cuts 48, 52 and usually requires a greater amount of effort for control measures.

The plurality of first cuts 48 and the plurality of second cuts 52 introduced into the laminated foam web 38 in the transverse direction Q1 are preferably made by knives, more preferably by parallel knives. Besides using knives, the skilled person will also be familiar with other methods for cutting foam webs such as sawing or water-jet cutting, which can be used just as readily.

The methods for introducing the plurality of first and second cuts 48, 52 can be moved through the laminated foam web 38 in the transverse direction Q1. The methods for introducing the plurality of first and second cuts 48, 52, however, can also extend over the entire width of the laminated foam web 38 in the transverse direction Q1, so that the introduction of the cuts 48, 52 can be achieved by moving perpendicularly to the top surface 50 and bottom surface 54 of the laminated foam web 38. Such methods can also be more easily moved in the conveying direction F along with the laminated foam web 38.

The plurality of first cuts 48 and the plurality of second cuts 52 can pass completely through the first foam web 24 of the laminated foam web 38, or they can pass only partially through it, so that a foam bridge remains between two adjacent strips 56.

According to the first aspect of the invention, the plurality of first cuts 48 can pass completely through the first foam web 24 only if the second barrier layer 46 has been provided on the second surface 40 of the first foam web 24. The plurality of connecting sections 58 in the area of the bottom surface 54 of the laminated foam web 38 is then formed by the second barrier layer 46 only. If the plurality of first cuts 48 does not pass completely through the first foam web 24, a foam bridge remains between adjacent foam strips 60. The plurality of connecting sections 58 in the area of the bottom surface 54 of the laminated foam web 38 then comprises this foam bridge and optionally the second barrier layer 46.

If the plurality of second cuts 52 passes completely through the first foam web 24, the plurality of connecting sections 58 in the area of the top surface 50 of the laminated foam web 38 are formed by the first barrier layer 34 only. In turn, if the plurality of second cuts 52 does not pass completely through the first foam web 24, the plurality of connecting sections 58 in the area of the top surface 50 of the laminated foam web 38 are formed by a foam bridge and the first barrier layer 34.

To facilitate the following steps of the production method, it is preferred that the connecting sections 58 be made as thin as possible. If the connecting sections 58 are formed only by the first barrier layer 34 and the second barrier layer 46, these form hinge-like joints in the area of the connecting sections 58 and connect the two adjacent strips 56 to each other in articulated fashion. A foam bridge between adjacent strips 56 or foam strips 60 will also form a hinge-like joint of this type. It must be kept in mind, however, that, as the thickness of the foam bridge increases, the following step of folding-over the strips 56 in the area of the connecting sections 58 becomes more difficult. A foam bridge induces resistance to the folding-over of the strips 56 as a result of its thickness. If such foam bridges are provided, these therefore preferably have a maximum thickness of 10 mm, more preferably a maximum thickness of 5 mm, and even more preferably a maximum thickness of 1-2 mm. The foam bridges are, however, advantageous in the way that they protect the first barrier layer 34 and/or the second barrier layer 46 from damage during the introduction of the first and second cuts 48, 52 and hold the strips 56 together more reliably in the longitudinal direction L1.

Figure 4:
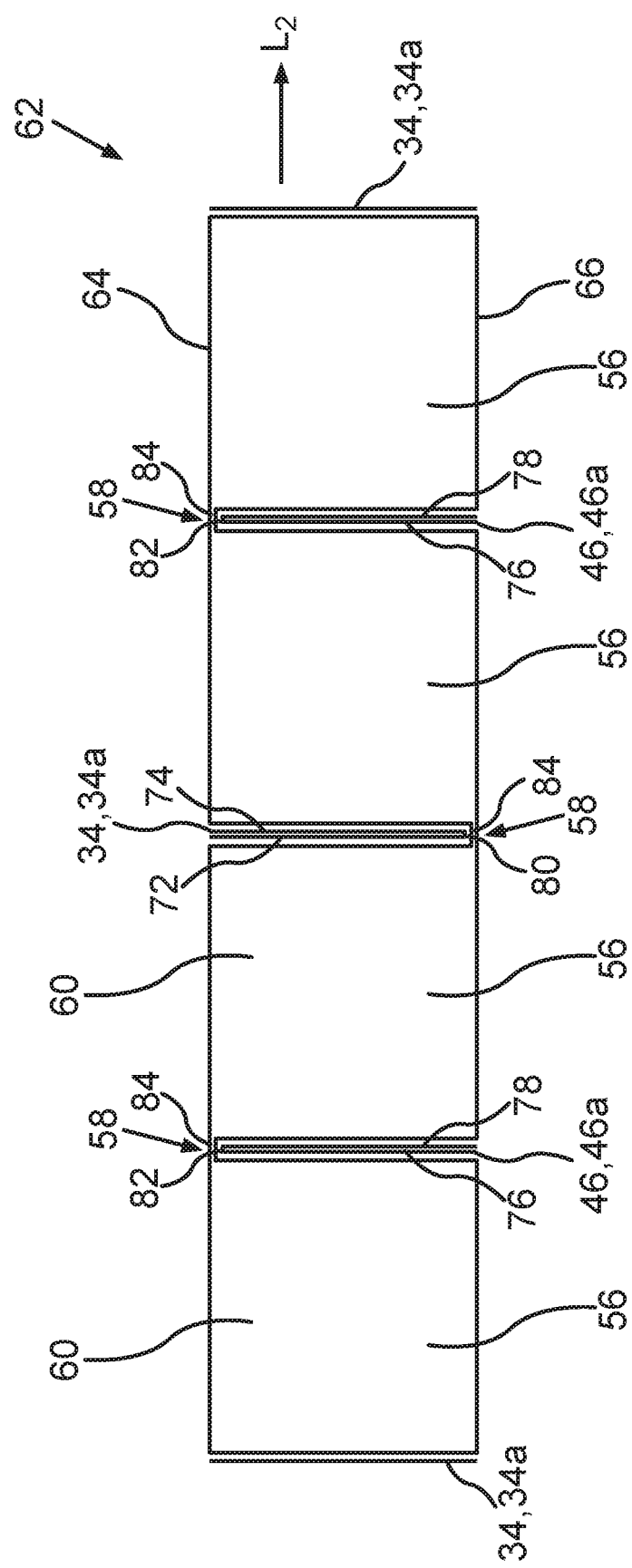
FIG. 4 shows a schematic, cross-sectional view of a foam-barrier layer web produced by the folding-over step according to FIG. 3.

FIG. 3 also shows the step of folding over the strips 56 in the area of the connecting sections 58 to produce a foam-barrier layer web 62. A cross section through the foam-barrier layer web 62 is shown in FIG. 4.

A pair of strips 56 which are separated from each other by a first cut 48 are connected to each other by a connecting section 58 in the area of the bottom surface 54 of the laminated foam web 38. These strips 56 are folded over in the area of these connecting sections 58 in such a way that subsections of the second surface 40 of the first foam web 24 or subsections of the bottom surface 54 of the laminated foam web 38 which are adjacent to a common connecting section 58 lie opposite each other. As a result, if provided, the second barrier layer 46 or the second barrier layer sections 46a become arranged in the interior of the foam-barrier layer web 62. The second barrier layer sections 46a of two adjacent strips 56 with a common connecting section 58 in the area of the bottom surface 54 then come to rest against each other, if possible two-dimensionally.

A pair of strips 56 which are separated from each other by a second cut 52 are connected to each other by a connecting section 58 in the area of the first surface 36 of the first foam web 24 or of the top surface 50 of the laminated foam web 38. These strips 56 are folded over in the area of these connecting sections 58 in such a way that subsections of the first surface 36 or of the top surface 50 of the laminated foam web 38 which are adjacent to a common connecting section 58 lie opposite each other. As a result, the first barrier layer 34 or the plurality of first barrier layer sections 34a become arranged in the interior of the foam-barrier layer web 62. The first barrier layer sections 34a of two adjacent strips 56 with a common connecting section 58 in the area of the top surface 50 come to rest against each other, if possible two-dimensionally.

As a result of the folding-over step, it is easy to arrange the first and second barrier layers 34, 36 in the interior of the foam-barrier layer web 62. There is no need for a complicated process of introducing a barrier layer material into cuts formed in a foam web or some other type of sealing element.

The folding-over of the strips 56 in the area of the connecting sections 58 is preferably carried out while the laminated foam web 38 or the strips 56 are being conveyed in the conveying direction F. Alternatives can also be provided for opening the plurality of first and second cuts 48, 52 to initiate the folding-over. For example, the conveying methods for the laminated foam web 38 and the foam-barrier layer web 62 can be configured to produce a difference between the conveying speeds of the webs in question in the conveying direction F and thus to pull the strips 56 apart in an area where they are folded over. For this purpose, the conveying speed of the foam-barrier layer web 62 in the conveying direction F is preferably greater than the conveying speed of the laminated foam web 38 in the conveying direction F. It is also possible, however, to provide alternatives which penetrate into the plurality of first cuts 48 and/or the plurality of second cuts 52 and gradually spread the adjacent strips 56 apart. The complete folding-over can be accomplished by appropriately adapted guides, which, for example, exert an appropriate pressure on the strips 56 and thus cause the strips 56 to fold over.

The foam-barrier layer web 62 comprises a top surface 64, a bottom surface 66, and two side surfaces 68, 70, which connect the top surface 64 and the bottom surface 66 to each other. The side surfaces 68, 70 are formed by the corresponding side surfaces 30, 32 of the first foam web 24 and the laminated foam web respectively. The top surface 64 of the foam-barrier layer web 62 is formed by the cut surfaces of the plurality of first cuts 48, which, as a result of the folding-over of the strips 56, are arranged on the top surface 64 of the foam-barrier layer web 62. The bottom surface 66 of the foam-barrier layer web 62 is formed by the cut surfaces of the plurality of second cuts 52, which, as a result of the folding-over of the strips 56, are arranged correspondingly on the bottom surface 66 of the foam-barrier layer web 62. A longitudinal direction L2 of the foam-barrier layer web 62 is parallel to the bottom surface 66 and parallel to the side surfaces 68, 70 of the foam-barrier layer web 62. The transverse direction Q2 of the foam-barrier layer web 62 is parallel to the bottom surface 66 and perpendicular to the longitudinal direction L2 of the foam-barrier layer web 62. Furthermore, the longitudinal direction L2 of the foam-barrier layer web 62 is preferably parallel to the longitudinal direction L1 of the (laminated) foam web 24, 38 and parallel to the conveying direction F. The transverse direction Q2 of the foam-barrier layer web 62 is parallel to the transverse direction Q1 of the foam web 24, 38.

FIG. 4 shows a cross-sectional view of the foam-barrier layer web 62 according to FIG. 3 in the longitudinal direction L2 of the foam-barrier layer web 62. The inwardly folded first and second barrier layer sections 34a, 46a now form first and second barrier layers 34, 46, each of which is accommodated between two adjacent foam strips 60, is oriented substantially perpendicularly to the bottom surface 66 of the foam-barrier layer web 62, and extends over a major portion of the thickness of the foam-barrier layer web 62 between its top surface 64 and its bottom surface 66.

As can be seen in FIG. 4, the barrier layer sections 34a of each of the first barrier layers 34 form legs 72, 74 of a first barrier layer 34, wherein each pair of adjacent legs 72, 74 is connected to each other. Each of the second barrier layer sections 46a of the second barrier layer 46 form legs 76, 78 of a second barrier layer 46, herein each pair of adjacent legs 76, 78 is also connected to each other.

The legs 72, 74, 76, 78 of the first and second barrier layers 34, 46 are obtained in particular by the previously described folding-over of the strips 56 along the connecting sections 58. The legs 72, 74 of the first barrier layer 34 are therefore connected to each other in the area of the associated adjacent connecting section 58. The legs 76, 78 of the second barrier layer 46 are also connected to each other in the area of an associated adjacent connecting section 58. The legs 72, 74 of the first barrier layer 34 are connected to each other in the area of the bottom surface 66 of the foam-barrier layer web 62, and the legs 76, 78 of the second barrier layer 46 are connected to each other in the area of the top surface 64 of the foam-barrier layer web 62. Considered in the longitudinal direction the foam-barrier layer web 62 preferably comprises an alternating sequence of first barrier layers 34 and second barrier layers 46, which extend in the transverse direction Q2 of the foam-barrier layer web 62. In the preferred embodiment, this is attributed to the fact that, when considered in the longitudinal direction, the first cuts 48 and the second cuts 52 are introduced into the laminated foam web 38 in an alternating sequence, so that the strips 56 thus formed are folded over in alternation, first in the area of a connecting section 58 at the top surface and then in the area of a connecting section 58 at the bottom surface.

As a result of the folding-over of the strips 56 along the connecting sections 58, the first and second barrier layers 34, 46 are curved in the area of the associated adjacent connecting section 58. The two legs 72, 74, 76, 78 of a barrier layer 34, 46 are then preferably connected to each other by a curved part 80, 82 of the associated barrier layer in the area of the longitudinal edges of the legs 72, 74, 76, 78. The curved part 80 of the first barrier layer 34 and the curved part 82 of the second barrier layer 46, however, can also be formed out of a different strip-like material, which is connected on both sides to the associated legs 72, 74, 76, 78. The curved part 80, 82 can have a U-shape or a V-shape or have some other geometric form. The legs 72, 74, 76, 78 and the curved part 80, 82 can, for example, form a loop. The two legs 72, 74, 76, 78 of a barrier layer 34, 46 preferably form a one-piece unit, i.e., are integrally formed. After the folding-over step, the legs 72, 74, 76, 78 of a barrier layer 34, 46 are substantially parallel to each other.

In FIG. 4, the foam-barrier layer web 62 comprises a preferred, substantially flat shape. This is obtained by, considered in the longitudinal direction L1, introducing the plurality of first cuts 48 and the plurality of second cuts 52 into the laminated foam web 38 at equal distances apart in order to produce strips 56 of equal width. As can be derived from FIGS. 3 and 4 in combination, the width of the strips 56 in the laminated foam web 38 corresponds to the thickness of the strips 56 after the folding-over step to obtain the foam-barrier layer web 62. A uniform width of all strips 56 of the laminated foam web 38 thus leads to a uniform thickness of the strips 56 in the foam-barrier layer web 62.

To obtain a profiled sealing tape 2 or a profiled foam-barrier layer web 62, however, it can also be desirable for the first cuts 48 and the second cuts 52 to be introduced into the laminated foam web 38 irregularly spaced apart from each other. In that case, the strips 56 in the laminated foam web 38 then have different widths, which means that the strips 56 in the foam-barrier layer web 62 have different thicknesses after being folded over. As a result, a profiled sealing tape 2 can be produced, which, after the sealing tape 2 has been installed, comprises certain regions compressed to a certain degree and other regions compressed to a different degree depending on the initial thickness of the respective region.

Two adjacent strips 56 are connected to each other at least by the legs 72, 74, 76, (which are themselves connected to each other) of the associated barrier layer 34, 46 or their curved part 80, 82. To obtain a further increase in the cohesion of the foam-barrier layer web 62, it is preferred that opposing subsections of the first surface 36 and of the second surface 50 of the foam strips 60, which are provided with the first barrier layer 34 or the second barrier layer 46, be connected to each other after the folding-over step. This can be done in particular by heating the strips 56 before they are connected, so that the material of the barrier layers 34, 46 is brought to a temperature above its melting temperature or adhesion point. Preferably, the strips 56 are connected by bonding opposing subsections of the first or second surface 36, 40 of the strips 56, which bonding comprises heating the first barrier layer 34 and optionally the second barrier layer 46, wherein an easy and uniform heating of the material can be achieved by heating the entire laminated foam web 38 before the strips 56 are folded over. For example, appropriate heating devices can be provided, which uniformly heat the top surface 50 and the bottom surface 54 of the laminated foam web 38. For example, the entire laminated foam web 38 can be conveyed through a heating tunnel.

The sealing tape strips 56 are then connected immediately after they have been folded over to form the foam-barrier layer web 62. If the barrier layers 34, 46 have been heated completely, the legs 72, 74; 76, 78 of the associated barrier layer 34, 46 which are opposite each other after the folding-over step will be bonded or fused together over a major part of their surfaces, preferably as completely as possible. The legs 72, 74; 76, 78 of the associated barrier layer 34, 46, however, can also be bonded or fused together only in certain areas.

It is also possible to heat the foam-barrier layer web 62 only after the strips 56 have been folded over. In this case, it can be sufficient to heat only the edge areas of the barrier layers 34, 46 in the area of the top surface 64 and the bottom surface 66 of the foam-barrier layer web 62. The individual legs 72, 74 and 76, 78 will then be bonded or fused together only in certain areas, namely, in these edge areas of the foam-barrier layer web 62. It is possible that the barrier layer sections 34a, 46a which have been bonded, preferably fused, together form a unit, at least in certain areas, and that, in such an area, it may be no longer possible to distinguish one from the other.

Connecting the strips 56 preferably comprises the application of pressure after the heating. The pressure is exerted substantially in the longitudinal direction L2 of the foam-barrier layer web 62, perpendicularly to the associated legs 72, 74; 76, 78 to be bonded together. As a result, the strips 56 to be bonded together are pressed flat against each other to achieve a reliable bond which is as complete as possible. Even light pressures can be sufficient to accomplish this. They can be exerted by, for example, adjusting the conveying speeds of the conveying devices of the foam-barrier layer web 62 accordingly. For example, if a region of the foam-barrier layer web 62 in a downstream position relative to the conveying direction F is being conveyed more slowly than an upstream region, the web 62 will be slightly compressed, as a result of which a corresponding pressure can be produced.

Alternatively or in addition to the heating of the strips 56 and connecting the strips 56 by legs 72, 74; 76, 78 of the first and second barrier layers 34, 46, additional connecting alternatives can be provided to connect adjacent strips 56 in the longitudinal direction L2. For example, an adhesive layer, preferably an adhesive tape, can be applied to one or more of the top surface 64, the bottom surface 66 and each of the side surfaces 68, 70 of the foam-barrier layer web 62. An additional adhesive can also be introduced between the strips 56.

As described under reference to FIG. 3, the plurality of first cuts 48 and the plurality of second cuts 52 extend only part of the way between the top surface 50 and the bottom surface 54 of the laminated foam web 38. To protect the first and second barrier layers 34, 46, it is also preferred that the plurality of first cuts 48 and the plurality of second cuts 52 do not pass completely through the first foam web 24, so that a bridge of foam remains between the cut in question and the top surface or bottom surface, whichever is nearest, of the first foam web 24. Such foam bridges 84 are easily recognized in FIG. 4. The foam bridges 84 connect adjacent strips 56 before and after the folding-over of said strips 56. As shown in FIG. 4, however, it is also possible for water vapor to diffuse through these foam bridges 84 and around the associated barrier layer 34, 46 in the longitudinal direction L between two adjacent strips 56 and later, therefore between adjacent sealing tape sections 20 of the sealing tape 2. The foam bridges 84 are therefore preferably made as small as possible. A foam bridges 84 preferably has a maximum thickness 10 mm, more preferably a maximum thickness of 5 mm, and even more preferably a maximum thickness of 1-2 mm. The indication of the thickness of the foam thickness 84 relates to an undeformed state of the webs 84, i.e., preferably a fully relaxed or expanded state of the first foam web 24 and prior to the folding-over of the strips 56.

Figure 5:
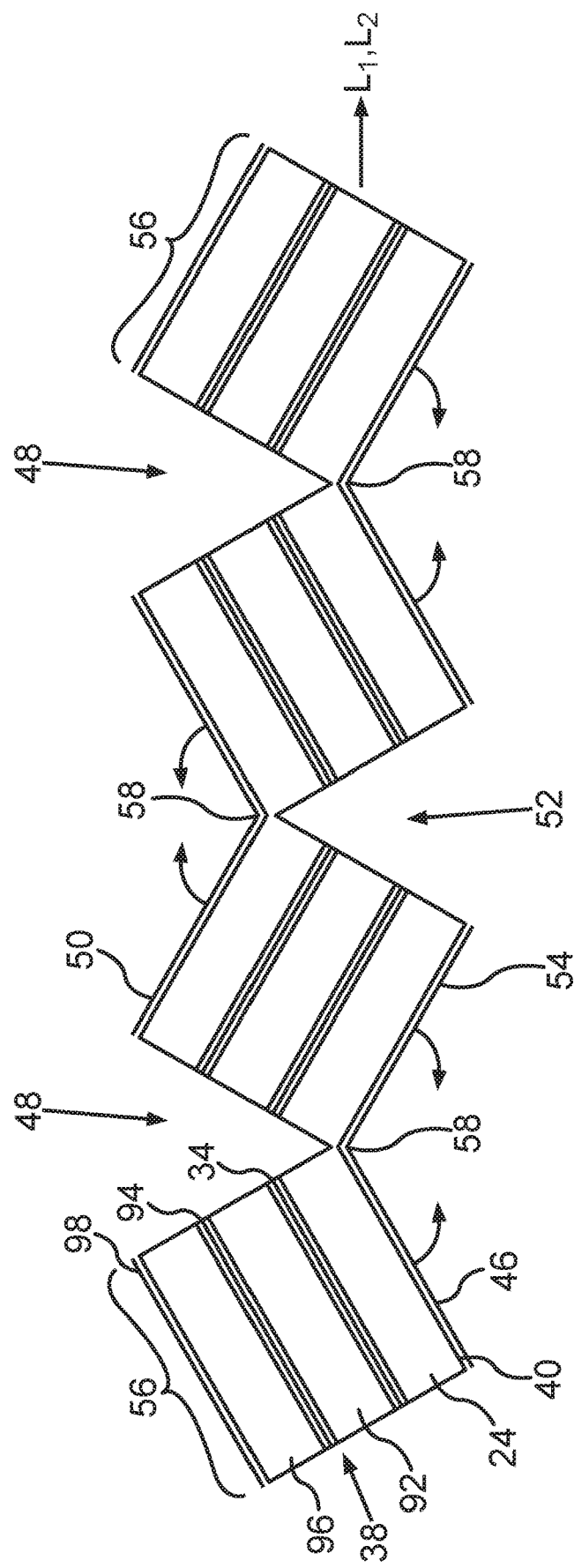
FIG. 5 shows a schematic, cross-sectional view of the step of folding over strips of a multi-ply laminated foam web.
Figure 6:
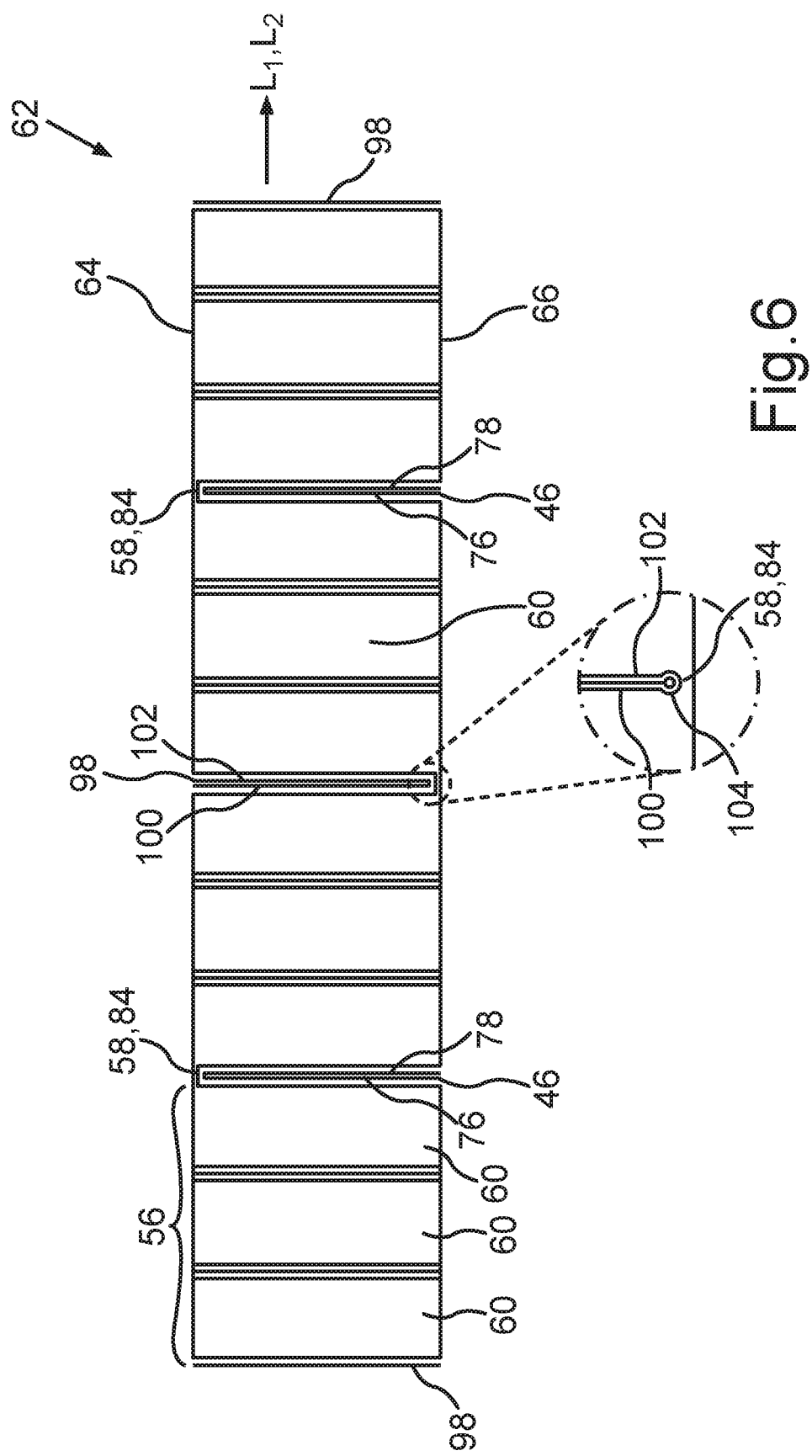
FIG. 6 shows a schematic, cross-sectional view of a foam-barrier layer web produced by the folding-over step according to FIG. 5.

Another exemplary embodiment is described on the basis of FIGS. 5 and 6, in which the foam-barrier layer web 62 is formed from a multi-ply laminated foam web 38. In the following, only the differences from previously described embodiments of a single-ply laminated foam web 38 will be discussed in detail. All other explanations and features with respect to the products and the method steps are to be applied in analogous fashion to this exemplary embodiment.

First, the first foam web 24 is provided, and the first barrier layer 34 is applied to its first surface 36, in the present case again to the top surface 6. The second barrier layer 46 is preferably applied to the second surface 40, here again the bottom surface 8 of the first foam web 24. Then the steps of providing at least one additional foam web of flexible foam, of arranging the at least one additional foam web in such a way that a first surface and a second surface of two adjacent foam webs lie opposite each other, and of arranging at least one barrier layer between each pair of adjacent foam webs are carried out. Preferably at least one of two facing first and second surfaces of two adjacent foam webs are provided with a barrier layer before the foam webs are arranged on top of each other.

With respect to the exemplary embodiment illustrated here, this means that a second foam web 92 is provided and supplied in such a way that its bottom surface is facing the top surface of the first foam web 24. The bottom surface of the second foam web 92 is applied to the first barrier layer 34 and preferably connected to the first foam web 24 by first barrier layer 34. The connection is achieved in the same way as described with respect to the bonding of the first and second barrier layers 34, 46 to the first foam web 24.

It is also preferred that a third barrier layer 94 be applied to a first surface of the second foam web 92, just as the first and second barrier layers 34, 46 were applied to the first foam web 24. The first surface of the second foam web 92 corresponds in this example to a top surface of the second foam web 92, whereas a second surface of the second foam web 92 corresponds to a bottom surface of that web.

In analogy to the second foam web 92, a third foam web 96 can be applied to the third barrier layer 94. The third foam web 96 comprises a first surface and a second surface, wherein here the first surface corresponds to a top surface and the second surface to a bottom surface of the third foam web 96. The second surface of the third foam web 96 rests flat against the third barrier layer 94.

The stack of alternating foam webs and barrier layers forms a multi-ply laminated foam web 38. The steps of applying additional foam webs and barrier layers can be repeated as often as desired to produce a multi-ply laminated foam web 38 of any desired size, which comprises at least two foam webs 24, 92. After the multi-ply laminated foam web 38 has been produced, the method can be continued in the same way as described on the basis of FIG. 3.

It is preferred that a barrier layer be applied to at least a first or a second surface of an external foam web, namely, to a first or second surface facing away from the other foam webs. The laminated foam web 38 then comprises a barrier layer 46, 98 on its top surface 50 and/or bottom surface 54. In the exemplary embodiment shown here, a fourth barrier layer 98 is applied to the first surface of the third foam web 96 and/or the second barrier layer 46 is applied to the second surface 40 of the first foam web 24.

Each barrier layer 34, 46, 94, 98 is bonded to the adjacent foam web or adjacent foam webs 24, 92, 96. With respect to the materials of the barrier layers and the bonding of a barrier layer to a foam web, reference is made to the discussion of the first and second barrier layers 24, 46 and of bonding of these layers to the first foam web 24, which is applicable here in an analogous manner.

In comparison to a single-ply laminated foam web 38, as previously described, the fourth barrier layer 98 takes the place of the first barrier layer 34 in the case of the multi-ply laminated foam web 38. A connecting area 58 in the area of the surface 50 of the laminated foam web 38 now comprises the fourth barrier layer 98 and/or a foam bridge 84, which is formed in the third foam web 96. A connecting area 58 in the area of the bottom surface 54 of the laminated foam web 38 still comprises the second barrier layer 46 and/or a foam bridge 84, which is formed in the first foam web 24 as discussed before. The principle is transferable to multi-ply laminated foam webs 38 of any desired size.

As can be seen in FIG. 5, a plurality of first cuts 48 is introduced into the top surface 50 of the multi-ply laminated foam web 38, and a plurality of second cuts 52 is introduced into the bottom surface 54 of the multi-ply laminated foam web 38. The plurality of first cuts 48 is introduced starting from the top surface 50 of the laminated foam web 38, so that they pass completely through at least the third foam web 96, the third barrier layer 94, the second foam web 92, the first barrier layer 34, and, if present, the fourth barrier layer 98. The plurality of first cuts 48 pass at least partially through the first foam web 24 (up as far as a potential foam bridge 84), or it can pass completely through. The plurality of second cuts 52 are introduced starting from the bottom surface 54 of the multi-ply laminated foam web 38, so that they pass completely through at least the first foam web 24, the first barrier layer 34, the second foam web 92, the third barrier layer 96, and, if present, the second barrier layer 46. The plurality of second cuts 52 pass at least partially through the third foam web 96 (up as far as a potential foam bridge 84), or it can pass completely through it. By introducing the plurality f first and second cuts 48, 52 with an offset from each other in the longitudinal direction L1, parallel strips 56 are formed, which are arranged behind each other in a row in the longitudinal direction L1. A connecting section 58 remains between two adjacent strips 56.

It can be seen that the introduction of the plurality of first and second cuts 48, 52 is accomplished in the same way as described with reference to FIG. 3.

The folding-over of the strips 56 to produce a foam-barrier layer web 62 is illustrated in FIG. 5 and indicated by arrows. The strips 56 are folded over in the area of the connecting sections 58 in such a way that subsections of the top surface 50 of the laminated foam web 38, which are adjacent to a common connecting section 58, lie opposite each other and so that subsections of the bottom surface 54 of the laminated foam web 38 which are adjacent to a common connecting section 58 lie opposite each other. A foam-barrier layer web 62 formed in this way is shown in FIG. 6.

The foam-barrier layer web 62 according to FIG. 6 differs from the foam-barrier layer web 62 according to FIG. 4 essentially in that each strip 56 comprises a plurality of foam strips 60 and additional interior barrier layer sections of the first and third barrier layers 34, 94, which are arranged next to the subsections of the second and fourth barrier layers 46, 98 arranged between the strips 56.

The second and fourth barrier layers 46, 98 in this embodiment form barrier layers which are accommodated between two adjacent strips 56, which are substantially perpendicular to the bottom surface 66 of the foam-barrier layer web 62, and which extend over a major portion of the thickness of the foam-barrier layer web 62 between its top surface 64 and its bottom surface 66. In addition, each strip 56 also contains additional barrier layer sections of the first and third barrier layers 34, 94. Because the barrier layer sections of the first and third barrier layers 34, 94 were not folded by a folding-over step, but were instead cut through by the first and second cuts 48, 52, they extend as a single layer within a strip 56 from the top surface 64 to the bottom surface 66 of the foam-barrier layer web 62.

It can be seen in FIG. 6 that a barrier layer section 46, 98 folded by the folding-over of the strips 56 comprises two legs 76, 78; 100, 102, which are connected to each other. The legs 76, 78, 100, 102 are connected to each other in the area of the associated adjacent connecting sections 58. As a result of the folding-over of the strips 56 along the connecting sections 58, the barrier layer sections 46, 98 are curved in the area of the associated adjacent connecting sections 58. The two legs 76, 78; 100, 102 of a barrier layer section 46, 98 are then preferably connected by a curved part 82, 104 of the associated barrier layer section 46, 98.

It is preferred that, after the folding-over step, the strips 56 be connected to each other by adhesion or fusing of each pair of the adjacent legs 74, 76; 100, 102 of the barrier layer sections 46, 98. The strips 56 are for this purpose heated and optionally pressed together, preferably before the folding-aver step. Alternatively, they could also be heated and possibly pressed together after the folding-over step.

Figure 7:
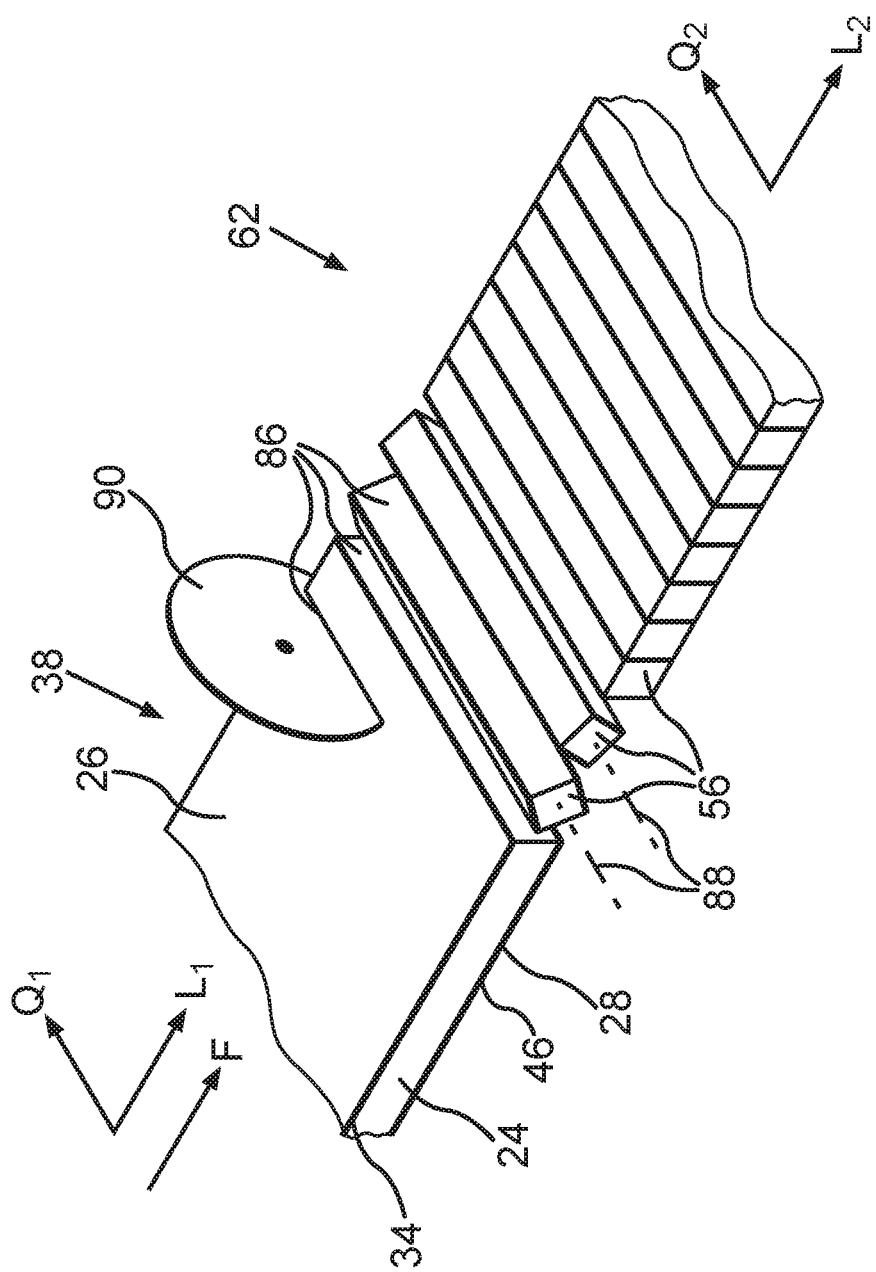
FIG. 7 shows an isometric view of the step of introducing a plurality of cuts into the first foam web according to a second aspect of the invention.

FIG. 7 shows part of a method according to a second aspect of the invention. First, a laminated foam web is produced, here again according to the embodiments of FIG. 2, in that a first foam web 24 is provided, whereupon a first barrier layer 34 and preferably also a second barrier layer 46 are applied to this web 24. In the embodiment shown here, the laminated foam web 38 comprises the first foam web 24, the first barrier layer 34 on the top surface 26 of the first foam web 24, and the second barrier layer 46 on the bottom surface 28 of the first foam web 24. Again, a multi-ply foam web 38 of any desired size can be used analogously.

The method according to the second aspect now differs from the method according to the first aspect shown in FIG. 3 in particular in that a plurality of cuts 86 are introduced into the laminated foam web 38 which pass completely through the laminated foam web 38. The plurality of cuts 86 are introduced in the transverse direction Q1 to form strips 56 arranged behind each other in a row in the longitudinal direction L1. Regardless of how many plies, i.e., how many foam webs and barrier layers, the laminated foam web 38 comprises, the plurality of cuts 86 passes through all these plies. The strips 56 formed in this way are therefore completely separated from each other. No connecting sections 58 like those previously described are present here.

After the plurality of cuts 86 have been introduced, each strip 56 is folded or tipped over around a folding axis 88, preferably about 90°. The strips 56 are folded over in such a way that subsections of the first surface 36 and subsections of the second surface 40 of the first foam web 24—or subsections of the top surface 50 and subsections of the bottom surface 54 of the laminated foam web 38—are arranged in the interior of the foam-barrier layer web 62. The cut surfaces of the plurality of first cuts 48 then form the top surface 64 of the foam-barrier layer web 62, and the cut surfaces of the plurality of second cuts 52 form the bottom surface 66 of the foam-barrier layer web 62.

All of the strips 56 can be folded or tipped over in the same direction around their individual folding axis 88. For example, they can be folded over in the conveying direction F or in the direction opposite to that. Preferably, in the foam-barrier layer web 62, each subsection of the top surface 50 of the laminated foam web 38 lies opposite a subsection of the bottom surface 54 of the laminated foam web 38. The strips 56, however, can also be folded over in alternating directions; for example, one strip 56 can be folded over in the conveying direction F, whereas the next strip is folded over opposite to the conveying direction F. The following strip 56 will then be folded over in the conveying direction F again. In the foam-barrier layer web 62, a subsection of the top surface 50 of the laminated foam web 38 will then lie opposite to a subsection of the bottom surface 54 of the laminated foam web 38.

The folding axis 88 is parallel to the transverse direction Q1 or Q2. The plurality of cuts 86 are introduced by being suitably adapted to the introduction of cuts. For example, for introducing cuts can be knives, saws, such as the circular saw 90 shown here, or other devices familiar to the skilled person.

Because the individual strips 56 are not bonded to each other at this point, the strips 56 in the foam-barrier layer web 62 are connected to each other in a subsequent step. The connection of adjacent strips 56 can be achieved by heating and by applying pressure or by the use of additional connecting alternatives, such as adhesives. Various possible ways of bonding barrier layers to foam webs and for connecting adjacent strips 56 have already been described herein and are adapted to the production of the connections and bonds required here in a similar fashion.

For example, it is possible to heat the laminated foam web 38 or the previously cut strips 56 before the folding-over step, so that the barrier layers 34, 66 are heated to or above a melting temperature or to their adhesion point, whereupon the strips 56 are folded over and bonded by the heated barrier layer sections, which now lie opposite each other in the foam-barrier layer web 62. Alternatively or in addition, an adhesive layer can be applied to one or a combination of the top surface 64, the bottom surface 66, and one or both side surfaces 68, 70 of the foam-barrier layer web 62 to connect the strips 56 with each other in the longitudinal direction L2. It is also possible, either alternatively or in addition, to introduce an adhesive between the strips 56.

Finally, at least one sealing tape roll 1 is produced from a foam-barrier layer web 62, formed according to one of the previously described possibilities. For this purpose, there are substantially three alternative methods available, which are described in detail with reference to FIGS. 8a-8c. The method steps according to FIGS. 8a-8c are all applicable to any previously described embodiments of the production method and to all embodiments of the foam-barrier layer web 62 formed by these methods.

Figure 8A:
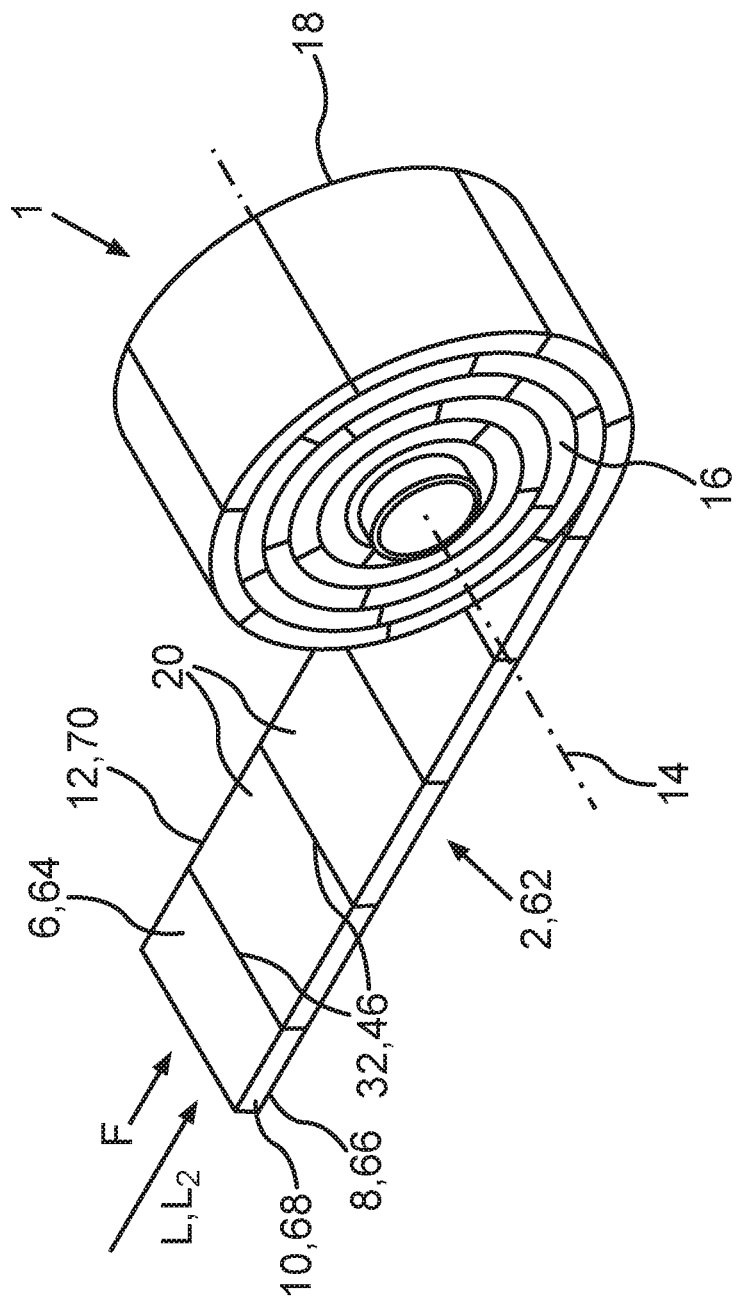
FIG. 8a shows an isometric view of the step of winding up the foam-barrier layer web into a sealing tape roll.

In the embodiment according to FIG. 8a, the foam-barrier layer web 62 already meets the requirements of a sealing tape 2 to be produced, in particular with respect to its width and the arrangement of interior barrier layers 34, 46. The foam-barrier layer web 62 therefore already corresponds to a sealing tape 2. Consequently, the top surface 64, the bottom surface 66, and the side surfaces 68, 70 of the foam-barrier layer web 62 form the top surface 6, the bottom surface 8, and the side surfaces 10, 12 of the sealing tape 2. The sealing tape 2 transported in the conveying direction F and formed by the foam-barrier layer web 62 is then simply wound up immediately into a sealing tape roll 1. The sealing tape 2 is wound up around a rotational axis 14 to obtain the sealing tape roll 1. It is preferred that the rotational axis be transverse to the longitudinal direction L and parallel to the bottom surface 8 of the sealing tape 2. The sealing tape 2 is wound up in such a way that the top surface 6 of one turn rests against the bottom surface 8 of an adjacent turn of the sealing tape roll 1, and the side surfaces 10, 12 of the sealing tape 2 form end surfaces 16, 18 of the sealing tape roll 1. The rotational axis 14, however, can also extend in a different direction, in particular in a direction transverse to the longitudinal direction L and perpendicular to the bottom surface 8 of the sealing tape 2 if desired.

The sealing tape 2 comprises a plurality of sealing tape sections 20, which are formed by the strips 56 of the foam-barrier layer web 62. In the unwound state of the sealing tape 2, the plurality of sealing tape sections 20 are arranged behind each other in a row in the longitudinal direction L, wherein a barrier layer 34, 46 is arranged between each pair of adjacent sealing tape sections 20. The barrier layers 34, 46 extend over at least 50% of the thickness of the sealing tape between the top surface 6 and the bottom surface 8.

Figure 8B:
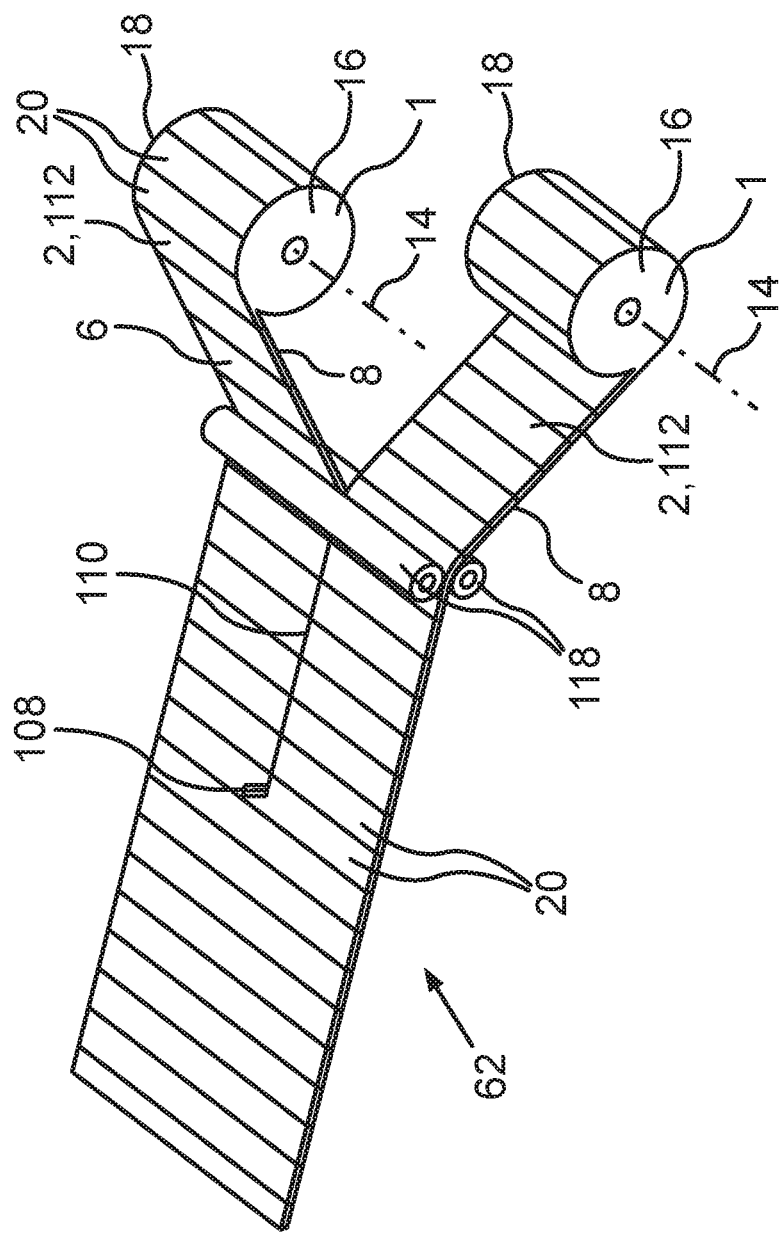
FIG. 8b shows an isometric view of the step of introducing a cut into the foam-barrier layer web and the step of winding up of foam-barrier layer strips thus formed into individual sealing tape rolls in an alternative embodiment.

If the foam-barrier layer web 62 is wider than the sealing tape 2 to be produced, the methods according to FIGS. 8*b* and 8*c* come into play.

In the embodiment according to FIG. 8*b*, the foam-barrier layer web 62 is cut through by one or more knives 108 or saws in the longitudinal direction L2. By this, at least one cut 110 is introduced into the foam-barrier layer web 62, as a result of which at least two foam-barrier layer strips 112 are produced. Preferably, each foam-barrier layer strip 112 is formed such that it corresponds to a sealing tape 2 to be produced. Each of these foam-barrier layer strips 112 or each sealing tape 2 is then wound up into a sealing tape roll 1 around a rotational axis 14. Thus the step of dividing the intermediate roll 114 described in the following on the basis of FIG. 8*c* is not needed.

The rotational axis 14 is preferably transverse to the longitudinal direction L and parallel to the bottom surface 8 of the sealing tape 2 or of the foam-barrier layer web 62. The sealing tape 2 is wound up in such a way that the top surface 6 of one turn rests against the bottom surface 8 of an adjacent turn of the sealing tape roll 1, and the side surfaces 10, 12 of the sealing tape 2 form end surfaces 16, 18 of the sealing tape roll 1. The rotational axis 14, however, can also extend in a different direction as described above.

According to the embodiment shown in FIG. 8*c*, the foam-barrier layer web 62 is first wound up into an intermediate roll 114. The foam-barrier layer web 62 is wound up into the intermediate roll 114 around a rotational axis 14. In this case as well, the rotational axis 14 is preferably perpendicular to the longitudinal direction L2 of the foam-barrier layer web 62 and parallel to its bottom surface 66 but can extend in a different direction as well. The foam-barrier layer web 62 is wound up into the intermediate roll 114 in such a way that the top surface 64 of one turn rests against the bottom surface 66 of an adjacent turn of the intermediate roll 114, and the side surfaces 68, 70 of the foam-barrier layer web 62 form end surfaces of the intermediate roll 114.

The intermediate roll 114 is then cut through at one or more points in the axial direction to produce a plurality of sealing tape rolls 1, which are narrower than the intermediate roll 114. The cutting of the intermediate roll 114 is preferably carried out by one or more parallel saws 116. In FIG. 8*c*, only one saw 116 is shown, and additional parallel cuts for cutting through the intermediate roll 114 are indicated in broken line. Other suitably adapted methods or devices for cutting through the intermediate roll can also be used instead of the saw (e.g., knives, heated wires, laser cutting, water-jet cutting). Each of the strips formed by cutting the foam-barrier layer web 62 wound up into the intermediate roll 114 then forms a sealing tape 2.

In all embodiments of FIG. 8*a* to 8*c*, the foam-barrier layer web 62 or the foam-barrier layer strips 112 are compressed before being wound up into a sealing tape roll 1 or an intermediate roll. This can be done either by upstream compression rollers or by pressure exerted on the foam-barrier layer web 62 or the foam-barrier layer strips 112 during the winding-up process. Corresponding compression rollers 118 are shown by way of example in FIG. 8*b*.

In all three of the embodiments according to FIGS. 8*a*-8*c*, an adhesive layer can be applied to the foam-barrier layer web 62, namely, to a surface arranged transversely to the barrier layers 6, 10, preferably to the bottom surface 66 of the foam-barrier layer web 62. The adhesive layer serves to attach the sealing tape 2 wound up into the sealing tape roll 1 to a window frame or door frame and is illustrated in FIG. 1 by adhesive layer 15. In the exemplary embodiment according to FIG. 8*b*, the adhesive layer can also be applied to the foam-barrier layer strips 112 after the strips have been formed. The adhesive layer is preferably configured as a double-sided adhesive tape lined on one side with a peel-off film. The adhesive tape, for its own part, is stored on a spool or roll, from which it is pulled off. The adhesive tape is applied to the foam-barrier layer web 62 preferably at the same time that the foam-barrier layer web 62 is wound up into the intermediate roll 112 or into the sealing tape roll 1, wherein the compression rollers 118 exert the pressure for bonding the adhesive tape and the foam-barrier layer web 62 or the foam-barrier layer strips 112 together.

The invention claimed is:

1. A method for producing a sealing tape roll with a plurality of interior barrier layers, each of which extends over at least 50% of a width of the sealing tape roll between opposite end surfaces of the sealing tape roll, comprising the steps of:
   (a) providing a first foam web of flexible foam comprising a top surface, a bottom surface, and two side surfaces connecting the top surface and the bottom surface to each other, wherein a longitudinal direction is defined parallel to the bottom surface and parallel to the side surfaces, and a transverse direction is defined parallel to the bottom surface and perpendicular to the longitudinal direction;
   (b) applying a first barrier layer to a first surface of the first foam web to form a laminated foam web, wherein the first surface corresponds to the top surface or to the bottom surface of the first foam web, and a second surface corresponds to the respective other one of the top surface and the bottom surface of the first foam web;
   (c) introducing a plurality of first cuts into a top surface of the laminated foam web in the transverse direction and introducing a plurality of second cuts into a bottom surface of the laminated foam web in the transverse direction to form strips arranged behind each other in a row in the longitudinal direction, wherein each of the second cuts is longitudinally offset from one of the first cuts, and wherein a connecting section remains between two adjacent strips;
   (d) folding over the strips in an area of the connecting sections to produce a foam-barrier layer web such that subsections of the top surface of the laminated foam web, which are adjacent to a common connecting section, lie opposite each other, and subsections of the bottom surface of the laminated foam web, which are adjacent to a common connecting section, lie opposite each other; and (e) forming the sealing tape roll by (i) winding up the foam-barrier layer web around a rotational axis to form the sealing tape roll; or (ii) winding up the foam-barrier layer web around a rotational axis to form an intermediate roll and cutting through the intermediate roll at one or more axially adjacent points to produce a plurality of sealing tape rolls, which are narrower than the intermediate roll; or (iii) introducing at least one cut into the foam-barrier layer web in a longitudinal direction of the foam-barrier layer web to form foam-barrier layer strips and winding up the foam-barrier layer strips around a rotational axis to form individual sealing tape rolls.

2. The method according to claim 1 wherein step (b) also includes the application of a second barrier layer to the second surface of the first foam web.

3. The method according to claim 1 wherein:
step (a) also comprises providing a first additional foam web of flexible foam; and
step (b) includes arranging the first additional foam web in such a way that the first barrier layer is arranged between the first foam web and the first additional foam web.

4. The method according to claim 3 further comprising the step of bonding the first foam web to the first additional foam web.

5. The method according to claim 3 further comprising the step of applying a barrier layer to surface of the first additional foam web which is an exterior foam web facing away from the first foam web.

6. The method according to claim 1 wherein, when considered in the longitudinal direction, a first cut of the plurality of first cuts and a second cut of the plurality of second cuts are introduced into the laminated foam web in alternation, respectively.

7. The method according to claim 1 wherein the plurality of first cuts and the plurality of second cuts are introduced at uniform distances from each other in the longitudinal direction of the laminated foam web to produce strips of equal width.

8. The method according to claim 2 wherein the plurality of first cuts pass completely through the first foam web, so that a plurality of connecting sections in an area of the second surface are formed by the second barrier layer alone, and wherein a plurality of second cuts do not pass completely through the first foam web, so that the plurality of connecting sections in an area of the first surface comprise a foam bridge.

9. The method according to claim 1 wherein the plurality of first cuts do not pass completely through the first foam web, so that a plurality of connecting sections in an area of the second surface comprise a foam bridge, and wherein the plurality of second cuts pass completely through the foam web, so that a plurality of connecting sections in an area of the first surface are formed by the first barrier layer alone.

10. The method according to claim 1 wherein the plurality of first cuts and the plurality or second cuts do not pass completely through the first foam web, so that a plurality of connecting sections in an area of the first surface comprise a foam bridge, and a plurality of connecting sections in an area of the second surface comprise a foam bridge.

11. The method according to claim 2 wherein the plurality of first cuts and a plurality of second cuts each pass completely through the first foam web, so that a plurality of connecting sections in an area of the first surface are formed by the first barrier layer alone, and a plurality of connecting sections in an area of the second surface are formed by the second barrier layer alone.

12. The method according to claim 2 further comprising the step of connecting the subsections of the first surface of the laminated foam web lying opposite to each other and being provided with a barrier layer; and of connecting the subsections of the bottom surface of the laminated foam web lying opposite to each other and being provided with a portion of the barrier layer.

13. A method for producing a sealing tape roll with a plurality of interior barrier layers, each of which extends over at least 50% of a width of the sealing tape roll between opposite end surfaces of the sealing tape roll, comprising the following steps:

(a) providing a first foam web of flexible foam comprising a top surface, a bottom surface, and two side surfaces connecting the top surface and the bottom surface to each other, wherein a longitudinal direction of the first foam web is defined parallel to the bottom surface and parallel to the side surfaces, and a transverse direction is defined parallel to the bottom surface and perpendicular to the longitudinal direction;

(b) applying a first barrier layer to a first surface of the first foam web to form a laminated foam web, wherein the first surface corresponds to the top surface or to the bottom surface of the first foam web, and a second surface corresponds to the respective other one of the top surface and the bottom surface of the first foam web;

(c) introducing a plurality of cuts into the laminated foam web in the transverse direction, the cuts passing completely through the laminated foam web, to form strips arranged behind each other in a row in the longitudinal direction;

(d) folding over each strip around a folding axis to produce a foam-barrier layer web, such that subsections of the top surface of the laminated foam web and subsections of the bottom surface of the laminated foam web are arranged in the interior of the foam-barrier layer web, wherein the folding axis extends in the transverse direction; and (e) forming the sealing tape roll by (i) winding up the foam-barrier layer web around a rotational axis into the sealing tape roll; (ii) winding up the foam-barrier layer web around a rotational axis into an intermediate roll and cutting through the intermediate roll at one or more axially adjacent points to produce a plurality of sealing tape rolls, which are narrower than the intermediate roll; or (iii) introducing at least one cut into the foam-barrier layer web in a longitudinal direction of the foam-barrier layer web to form foam-barrier layer strips and winding up the foam-barrier layer strips around a rotational axis into individual sealing tape rolls.

14. The method according to claim 13 wherein step (b) also comprises applying a second barrier layer to the second surface of the first foam web, wherein the plurality of cuts also pass completely through the second barrier layer.

15. The method according to claim 13 further comprising the step of connecting adjacent strips of the foam-barrier layer web between step (d) and step (e).

* * * * *